(12) United States Patent
Muto et al.

(10) Patent No.: US 12,219,275 B2
(45) Date of Patent: Feb. 4, 2025

(54) SOLID IMAGING DEVICE AND ELECTRONIC DEVICE

(71) Applicant: Sony Semiconductor Solutions Corporation, Kanagawa (JP)

(72) Inventors: Atsushi Muto, Shizuoka (JP);
Shinichirou Etou, Kanagawa (JP);
Atsumi Niwa, Kanagawa (JP);
Masafumi Yamashita, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 103 days.

(21) Appl. No.: 18/246,821

(22) PCT Filed: Oct. 14, 2021

(86) PCT No.: PCT/JP2021/038014
§ 371 (c)(1),
(2) Date: Mar. 27, 2023

(87) PCT Pub. No.: WO2022/091795
PCT Pub. Date: May 5, 2022

(65) Prior Publication Data
US 2023/0362503 A1 Nov. 9, 2023

(30) Foreign Application Priority Data
Oct. 28, 2020 (JP) .................. 2020-180109

(51) Int. Cl.
*H04N 25/47* (2023.01)
*H04N 25/77* (2023.01)
*H04N 25/78* (2023.01)

(52) U.S. Cl.
CPC ............. *H04N 25/47* (2023.01); *H04N 25/77* (2023.01); *H04N 25/78* (2023.01)

(58) Field of Classification Search
None
See application file for complete search history.

(56) References Cited

U.S. PATENT DOCUMENTS

| 11,483,498 B2 | 10/2022 | Ogawa |
| 2013/0070133 A1 | 3/2013 | Takazawa |

(Continued)

FOREIGN PATENT DOCUMENTS

| EP | 3576404 A1 | 12/2019 |
| JP | 2017535999 A | 11/2017 |

(Continued)

OTHER PUBLICATIONS

English translation of W, O-2019150786-A1Niwa, 2019 (Year: 2019).*

(Continued)

*Primary Examiner* — James M Hannett
(74) *Attorney, Agent, or Firm* — Michael Best & Friedrich LLP

(57) ABSTRACT

Solid state imaging devices and electronic devices are disclosed. In one example, an imaging device includes photoelectric conversion sections arranged on a first chip and at least a part of each of detection circuits, an arbiter, and a signal processing circuit arranged on a second chip stacked on the first chip. A first region in the first chip in which the photoelectric conversion sections is arrayed and a second region in the second chip in which at least a part of each of the detection circuits is arrayed are at least partially superimposed in a stacking direction, and a logic circuit including the arbiter and the signal processing circuit is arranged in a third region at least partially adjacent to the second region in the second chip.

15 Claims, 22 Drawing Sheets

(56) References Cited

U.S. PATENT DOCUMENTS

2017/0094250 A1  3/2017  Williams
2022/0253519 A1* 8/2022  Wakabayashi ....... G06V 10/141

FOREIGN PATENT DOCUMENTS

| JP | 2020174240 A | 10/2020 | |
|---|---|---|---|
| WO | WO-2019150786 A1 * | 8/2019 | ........... H04N 23/667 |
| WO | WO-2020066432 A1 | 4/2020 | |
| WO | 2020105313 A1 | 5/2020 | |

OTHER PUBLICATIONS

International Search Report (PCT/ISA/210), International Application No. PCT/JP2021/038014, dated Dec. 28, 2021.

* cited by examiner

SOLID IMAGING DEVICE AND ELECTRONIC DEVICE

FIELD

The present disclosure relates to a solid imaging device and an electronic device.

BACKGROUND

In a solid imaging device using a complementary metal oxide semiconductor (CMOS) or the like, an asynchronous solid imaging element that detects a luminance change in each pixel in real time as an event has been proposed (for example, Patent Literature 1). As described above, the solid imaging element that detects an event in each pixel is also referred to as an event-based vision sensor (EVS) or a dynamic vision sensor (DVS).

CITATION LIST

Patent Literature

Patent Literature 1: JP 2017-535999 A

SUMMARY

Technical Problem

However, an EVS requires a circuit configuration to detect an event on the basis of a voltage signal in addition to a circuit configuration to convert a photocurrent flowing out from each pixel into the voltage signal. However, conventionally, a suitable layout in a case where these circuit configurations and a light receiving element are mounted on a single chip has not been proposed.

Thus, the present disclosure proposes a solid imaging device and an electronic device in which circuit configurations and a light receiving element are suitably laid out.

Solution to Problem

To solve the problems described above, a solid imaging device according to an embodiment of the present disclosure includes: a plurality of unit pixels arrayed in a two-dimensional lattice pattern; an arbiter that arbitrates readout with respect to the plurality of unit pixels; and a first signal processing circuit that processes a first signal output from each of the unit pixels, wherein each of the unit pixels includes a plurality of photoelectric conversion sections arrayed in a two-dimensional lattice pattern, and a plurality of detection circuits that detects a luminance change in incident light to the photoelectric conversion sections on a basis of a photocurrent flowing out from each of the photoelectric conversion sections and outputs the first signal, the plurality of photoelectric conversion sections is arranged on a first chip, at least a part of each of the detection circuits, the arbiter, and the first signal processing circuit are arranged on a second chip stacked on the first chip, a first region in the first chip in which the plurality of photoelectric conversion sections is arrayed and a second region in the second chip in which at least a part of each of the detection circuits is arrayed are at least partially superimposed in a stacking direction of the first chip and the second chip, and a logic circuit including the arbiter and the first signal processing circuit is arranged in a third region at least partially adjacent to the second region in the second chip.

DESCRIPTION OF EMBODIMENTS

Figure 1:
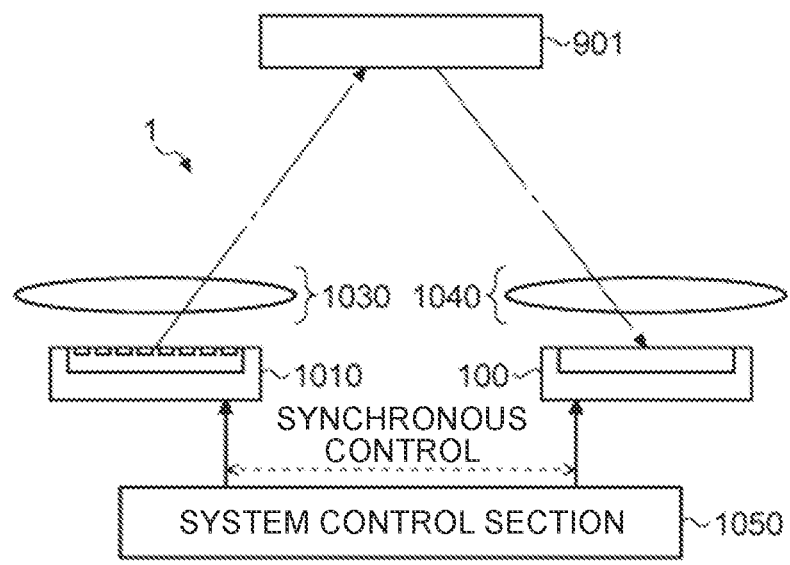
FIG. 1 is a schematic diagram depicting a schematic configuration example of an electronic device on which a solid imaging device according to a first embodiment is mounted.

Hereinafter, embodiments of the present disclosure will be described in detail on the basis of the drawings. Note that in the following embodiments, overlapped description is omitted by assignment of the same reference sign to the same parts.

Also, the present disclosure will be described in the following order of items.
1. First Embodiment
1.1 System configuration example
1.2 Configuration example of a solid imaging device
1.3 Stacked structure example of the solid imaging device
1.4 Circuit configuration example of a unit pixel
1.4.1 Luminance pixel
1.4.2 Event pixel
1.4.2.1 Configuration example of an address event detection circuit
1.4.2.2 Configuration example of a light receiving circuit
1.4.2.3 Modification example of a light receiving circuit
1.4.3 Modification example related to pixel sharing
1.5 Chip layout example
1.5.1 First layout example
1.5.2 Second layout example
1.5.3 Third layout example
1.5.4 Fourth layout example
1.5.5 Fifth layout example
1.6 Conclusion
1.7 Modification example
1.7.1 Stacked structure example of a solid imaging device
1.7.2 Chip layout example
2. Second Embodiment
2.1 Chip layout example
2.1.1 First layout example
2.1.2 Second layout example
2.2 Conclusion
3. Specific example of an electronic device
4. Example of application to a mobile body

1. First Embodiment

First, a solid imaging device and an electronic device according to the first embodiment will be described in detail with reference to the drawings. In the present embodiment, a solid imaging device and an electronic device having a hybrid structure in which an EVS that detects an event on the basis of a luminance change and an image sensor that detects luminance and generates image data are incorporated in a single chip will be described as an example. Note that in the following description, a complementary metal-oxide semiconductor (CMOS) image sensor (hereinafter, simply referred to as an image sensor) will be described as an example of the image sensor. However, this is not a limitation, and various sensors including a photoelectric conversion element, such as a charge-coupled device (CCD) image sensor and a time-of-flight (ToF) sensor can be employed.

1.1 System Configuration Example

Figure 2:
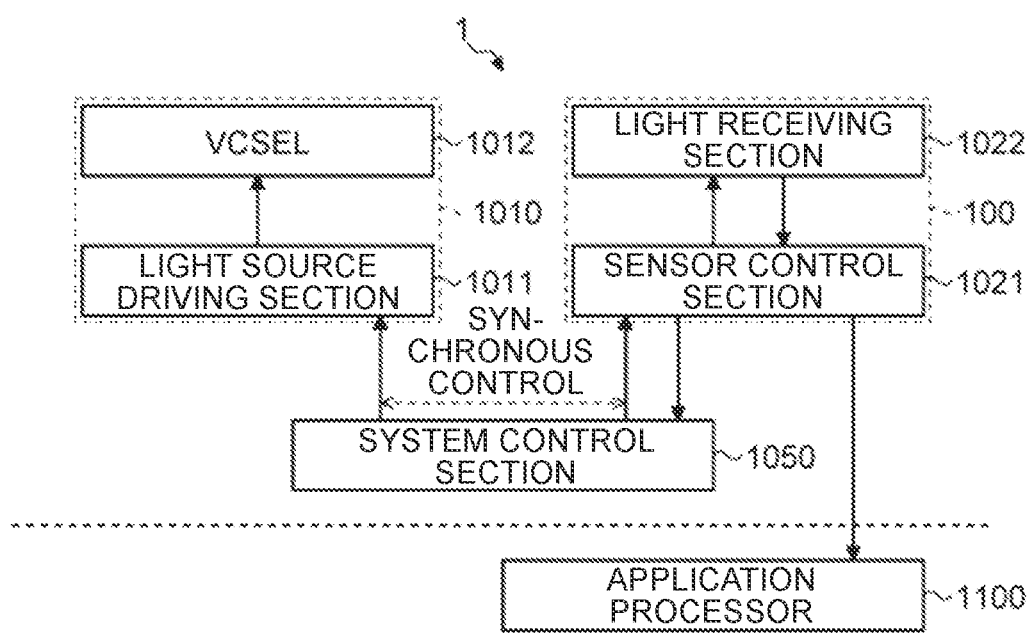
FIG. 2 is a block diagram depicting a system configuration example of the electronic device according to the first embodiment.

FIG. 1 is a schematic diagram illustrating a schematic configuration example of an electronic device on which the solid imaging device according to the first embodiment is mounted, and FIG. 2 is a block diagram illustrating a system configuration example of the electronic device according to the first embodiment.

As depicted in FIG. 1, an electronic device 1 according to the present embodiment includes a laser light source 1010, an irradiation lens 1030, an imaging lens 1040, a solid imaging device 100, and a system control section 1050.

As depicted in FIG. 2, the laser light source 1010 includes, for example, a vertical cavity surface emitting laser (VCSEL) 1012, and a light source driving section 1011 that drives the VCSEL 1012. However, the VCSEL 1012 is not a limitation, and various light sources such as a light emitting diode (LED) may be used. Furthermore, the laser light source 1010 may be any of a point light source, a surface light source, and a line light source. In a case of the surface light source or the line light source, the laser light source 1010 may have, for example, a configuration in which a plurality of point light sources (such as VCSELs) is arrayed one-dimensionally or two-dimensionally. Note that in the present embodiment, the laser light source 1010 may emit light of a wavelength band different from a wavelength band of visible light, such as infrared (IR) light, for example.

The irradiation lens 1030 is arranged on an emission surface side of the laser light source 1010, and converts light emitted from the laser light source 1010 into irradiation light having a predetermined divergence angle.

The imaging lens 1040 is arranged on a light receiving surface side of the solid imaging device 100, and forms an image by incident light on a light receiving surface of the solid imaging device 100. The incident light can also include reflected light emitted from the laser light source 1010 and reflected on a subject 901.

Although details will be described later, as depicted in FIG. 2, the solid imaging device 100 includes, for example, a light receiving section 1022 in which pixels that detect luminance (hereinafter, referred to as luminance pixels) and pixels that detect events (hereinafter, referred to as event pixels) are arrayed in a two-dimensional lattice pattern, and a sensor control section 1021 that generates image data based on a luminance signal detected by each of the luminance pixels (hereinafter, referred to as image frame data) and data based on event data detected by each of the event pixels (hereinafter, referred to as event frame data) by driving the light receiving section 1022.

The system control section 1050 includes, for example, a processor (CPU), and drives the VCSEL 1012 via the light source driving section 1011. Furthermore, the system control section 1050 obtains the image frame data by controlling the solid imaging device 100, and obtains event data detected according to light emission/extinction of the laser light source 1010 by controlling the solid imaging device 100 in synchronization with the control on the laser light source 1010.

For example, the irradiation light emitted from the laser light source 1010 is projected onto a subject (also referred to as a measurement target or an object) 901 through the irradiation lens 1030. The projected light is reflected on the subject 901. Then, the light reflected on the subject 901 passes through the imaging lens 1040 and becomes incident on the solid imaging device 100. The EVS in the solid imaging device 100 receives the reflected light reflected on the subject 901, generates the event data, and generates the event frame data that is one image on the basis of the generated event data. On the other hand, the image sensor in the solid imaging device 100 receives, for example, visible light in the incident light and generates the image frame data. The image frame data and the event frame data generated by the solid imaging device 100 are supplied to an application processor 1100 of the electronic device 1. The application processor 1100 executes predetermined processing such as image processing and recognition processing on the image frame data and the event frame data input from the solid imaging device 100.

1.2 Configuration Example of a Solid Imaging Device

Figure 3:
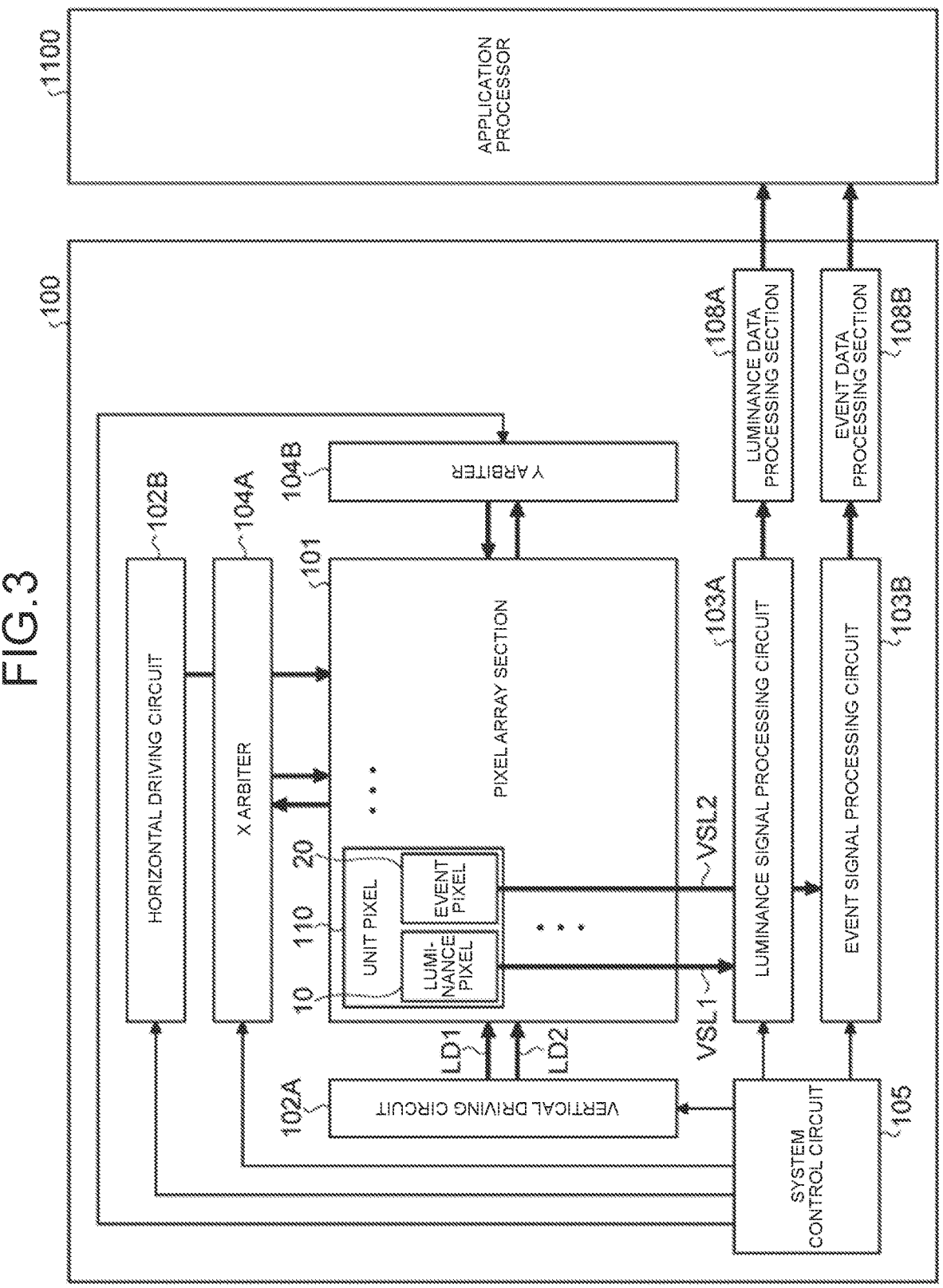
FIG. 3 is a block diagram depicting a schematic configuration example of the solid imaging device according to the first embodiment.

FIG. 3 is a block diagram depicting a schematic configuration example of the solid imaging device according to the first embodiment. As illustrated in FIG. 3, the solid imaging device 100 according to the present embodiment includes, for example, a pixel array section 101, a vertical driving circuit 102A, a horizontal driving circuit 102B, an X arbiter 104A, a Y arbiter 104B, a luminance signal processing circuit 103A, an event signal processing circuit 103B, a system control circuit 105, a luminance data processing section 108A, and an event data processing section 108B.

The pixel array section 101 has a configuration in which unit pixels 110 to be units of repetition in a pixel layout are arranged in a row direction and a column direction, that is, in a two-dimensional lattice pattern (also referred to as a matrix pattern). Here, the row direction (also referred to as a row direction) means an array direction of pixels in a pixel row (lateral direction in the drawing), and the column direction (also referred to as a column direction) means an array direction of pixels in a pixel column (longitudinal direction in the drawing). Note that the units of repetition described herein are different from units of repetition in a color filter array such as a Bayer array or a quad-Bayer array, and may be configuration units repeated in device design.

Each of the unit pixels 110 includes one or more luminance pixels 10 and one or more event pixels 20. In the present description, each of the luminance pixels 10 and the event pixels 20 may be simply referred to as a pixel. Although details of a specific circuit configuration and a pixel structure of each of the unit pixels 110 will be described later, the luminance pixel 10 includes a photoelectric conversion element that generates and accumulates a charge corresponding to luminance of the incident light, and generates a luminance signal of a voltage according to the luminance. On the other hand, each of the event pixels 20 includes a photoelectric conversion element to generate a charge corresponding to the luminance of the incident light, and outputs a request for readout from itself to the X arbiter 104A and the Y arbiter 104B and outputs event data, which indicates that an event is detected, according to arbitration by the X arbiter 104A and the Y arbiter 104B in a case where a luminance change in the incident light is detected on the basis of a photocurrent flowing out of the photoelectric conversion element.

In the pixel array section 101, pixel driving lines LD1 and LD2 are wired in the row direction for each pixel row, and vertical signal lines VSL1 and VSL2 are wired in the column direction for each pixel column with respect to the pixel array in the matrix pattern. For example, the pixel driving line LD1 is connected to the luminance pixels 10 in each row, and the pixel driving line LD2 is connected to the event pixels 20 in each row. On the other hand, for example, the vertical signal line VSL1 is connected to the luminance pixels 10 in each column, and the vertical signal line VSL2 is connected to the event pixels 20 in each column. However, this is not a limitation, and the pixel driving lines LD1 and LD2 may be wired in such a manner as to be orthogonal to each other. Similarly, the vertical signal lines VSL1 and VSL2 may be wired in such a manner as to be orthogonal to each other. For example, a pixel driving line LD1 may be wired in the row direction, a pixel driving line LD2 may be wired in the column direction, a vertical signal line VSL1 may be wired in the column direction, and a vertical signal line VSL2 may be wired in the row direction.

The pixel driving line LD1 transmits a control signal to perform driving of when a luminance signal is read from each of the luminance pixels 10. The pixel driving line LD2 transmits a control signal to bring each of the event pixels 20 into an active state in which an event can be detected. Although each of the pixel driving lines LD1 and LD2 is illustrated as one wiring line in FIG. 3, the number thereof is not limited to one. One end of each of the pixel driving line LD1 and the pixel driving line LD2 is connected to an output end corresponding to each row of the vertical driving circuit 102A.

(Driving Configuration of a Luminance Pixel)

As will be described later in detail, each of the luminance pixels 10 includes a photoelectric conversion section that photoelectrically converts the incident light and generates a charge, and a pixel circuit that generates a luminance signal having a voltage value corresponding to an amount of charges generated in the photoelectric conversion section, and causes the luminance signal to appear in the vertical signal line VSL1 under the control by the vertical driving circuit 102A.

The vertical driving circuit 102A includes a shift register, an address decoder, and the like, and drives the luminance pixels 10 of the pixel array section 101 at the same time with respect to all the pixels or in units of rows. That is, the vertical driving circuit 102A and the system control circuit 105 that controls the vertical driving circuit 102A are included in a driving section that controls the operation of each of the luminance pixels 10 of the pixel array section 101. The vertical driving circuit 102A generally includes two scanning systems, which are a readout scanning system and a sweeping scanning system, although illustration of a specific configuration thereof is omitted.

The readout scanning system selectively scans the pixels of the pixel array section 101 sequentially in units of rows in order to read out a signal from each pixel. The luminance signal read from each pixel is an analog signal. The sweeping scanning system performs sweeping scanning on a readout row, on which readout scanning is performed by the readout scanning system, prior to the readout scanning for an exposure time.

By the sweeping scanning by the sweeping scanning system, unnecessary charges are swept out from the photoelectric conversion element of each pixel in a readout row, whereby the photoelectric conversion element is reset. Then, by sweeping out (resetting) of the unnecessary charges by the sweeping scanning system, so-called electronic shutter operation is performed. Here, the electronic shutter operation means operation of discarding charges of the photoelectric conversion element and newly starting exposure (starting accumulation of charges).

A signal read by the readout operation by the readout scanning system corresponds to a quantity of light received after the immediately preceding readout operation or the electronic shutter operation. Then, a period from a readout timing by the immediately preceding readout operation or a sweeping timing by the electronic shutter operation to a readout timing by the current readout operation is a charge accumulation period (also referred to as an exposure period) in each pixel.

The luminance signal output from each of the luminance pixels 10 in the pixel row selectively scanned by the vertical driving circuit 102A is input to the luminance signal processing circuit 103A through each vertical signal line VSL1 for each pixel column. With respect to each pixel column of the pixel array section 101, the luminance signal processing circuit 103A performs predetermined signal processing on the luminance signal output from each of the luminance pixels 10 in the selected row through the vertical signal line VSL1, and temporarily holds the luminance signal after the signal processing.

Specifically, the luminance signal processing circuit 103A performs, as the signal processing, at least noise removal processing such as correlated double sampling (CDS) processing or double data sampling (DDS) processing. For example, a fixed pattern noise unique to a pixel, such as a reset noise and a threshold variation of an amplification transistor in the pixel is removed by the CDS processing. The luminance signal processing circuit 103A also has, for example, an analog-digital (AD) conversion function, converts an analog luminance signal read from the photoelectric conversion element into a digital signal, and outputs the digital signal.

The horizontal driving circuit 102B includes a shift register, an address decoder, and the like, and sequentially selects readout circuits corresponding to the pixel columns of the luminance signal processing circuit 103A (hereinafter, referred to as pixel circuits). By the selective scanning by the horizontal driving circuit 102B, the luminance signals on which the signal processing is performed in each of the pixel circuits in the luminance signal processing circuit 103A are sequentially output.

(Driving Configuration of an Event Pixel)

Each of the event pixels 20 detects presence or absence of an event on the basis of whether a change exceeding a predetermined threshold is generated in the photocurrent corresponding to the luminance of the incident light. For example, each of the event pixels 20 detects, as an event, that the luminance change exceeds or falls below the predetermined threshold.

When detecting the event, each of the event pixels 20 outputs, to each of the X arbiter 104A and the Y arbiter 104B, a request that requests permission to output event data indicating the generation of the event. Then, in a case of receiving a response indicating the permission to output the event data from each of the X arbiter 104A and the Y arbiter 104B, each of the event pixels 20 outputs the event data to the vertical driving circuit 102A and the event signal processing circuit 103B.

Furthermore, the event pixel 20 that detects the event outputs an analog luminance signal generated by photoelectric conversion to the luminance signal processing circuit 103A. That is, as a result of the arbitration by the X arbiter 104A and the Y arbiter 104B, the event pixel 20 permitted to perform readout requests the vertical driving circuit 102A for driving of itself. On the other hand, by driving the luminance pixel 10 paired with the event pixel 20 for which the readout is permitted by the arbitration, the vertical driving circuit 102A reads the luminance signal from the luminance pixel 10.

The X arbiter 104A arbitrates a request for the output of the event data, which request is supplied from each of the plurality of event pixels 20, and transmits a response based on a result of the arbitration (permission/non-permission of the output of the event data) and a reset signal that resets the event detection to each of the event pixels 20 that outputs the request.

The event signal processing circuit 103B executes predetermined signal processing on the event data input from each of the event pixels 20, and outputs the event data after the signal processing.

As described above, the change in the photocurrent generated in each of the event pixels 20 can also be regarded as a light quantity change (luminance change) of the light incident on the photoelectric conversion section of the event pixel 20. Thus, it can also be said that the event is the light quantity change (luminance change) in the event pixels 20 which change exceeds the predetermined threshold. The event data indicating the generation of the event includes at least position information such as coordinates indicating a position of the event pixel 20 where the light quantity change as the event is generated. The event data can include a polarity of the light quantity change in addition to the position information.

For a series of the event data output from the event pixel 20 at a timing at which the event is generated, as long as an interval between pieces of the event data at the time of the generation of the event is maintained as it is, it can be said that the event data implicitly includes time information indicating relative time of the generation of the event.

However, when the interval between the pieces of event data is not maintained as that at the time of the generation of the event due to storage of the event data into the memory or the like, the time information implicitly included in the event data is lost. Thus, before the interval between the pieces of event data at the time of the generation of the event comes to be not maintained as it is, the event signal processing circuit 103B may include time information indicating relative time at which the event is generated, such as a time stamp in the event data.

(Other Configurations)

The system control circuit 105 includes a timing generator that generates various timing signals, and the like, and performs driving control of the vertical driving circuit 102A, the horizontal driving circuit 102B, the X arbiter 104A, the Y arbiter 104B, the luminance signal processing circuit 103A, the event signal processing circuit 103B, and the like on the basis of various timings generated by the timing generator.

Each of the luminance data processing section 108A and the event data processing section 108B has at least an arithmetic processing function, and performs various kinds of signal processing such as arithmetic processing on the image data (image frame data and event frame data) output from the luminance signal processing circuit 103A or the event signal processing circuit 103B.

For example, the image data output from the luminance data processing section 108A or the event data processing section 108B may be subjected to predetermined processing in the application processor 1100 or the like in the electronic device 1 on which the solid imaging device 100 is mounted, or may be transmitted to the outside via a predetermined network.

Note that the solid imaging device 100 may include a storage section to temporarily hold data necessary for the signal processing in the luminance data processing section 108A and the event data processing section 108B, data processed by any one or more of the luminance signal processing circuit 103A, the event signal processing circuit 103B, the luminance data processing section 108A, and the event data processing section 108B, and the like.

1.3 Stacked Structure Example of the Solid Imaging Device

Figure 4:
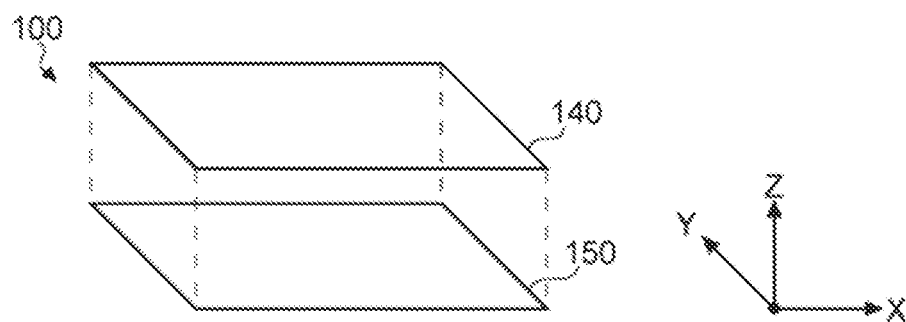
FIG. 4 is a diagram depicting a stacked structure example of the solid imaging device according to the first embodiment.

FIG. 4 is a diagram depicting a stacked structure example of the solid imaging device according to the first embodiment. As depicted in FIG. 4, the solid imaging device 100 has a structure in which a pixel chip 140 and a circuit chip 150 are vertically stacked. The pixel chip 140 is, for example, a semiconductor chip including a photoelectric conversion section of each of the luminance pixels 10 and the event pixels 20 and a part of circuit configurations in the luminance pixels 10 and the event pixels 20, and the circuit chip 150 is a semiconductor chip including a configuration other than the configurations arranged in the pixel chip 140.

For bonding of the pixel chip 140 and the circuit chip 150, for example, so-called direct bonding in which bonded surfaces thereof are flattened and are bonded to each other by force between electrons can be used. However, this is not a limitation, and for example, so-called Cu—Cu bonding in which copper (Cu) electrode pads formed on the bonded surfaces are bonded to each other, bump bonding, or the like can also be used.

Furthermore, the pixel chip 140 and the circuit chip 150 are electrically connected via a connection section such as a through contact via (TCV) penetrating a semiconductor substrate, for example. For the connection using the TCV, for example, a so-called twin TCV method in which two TCVs that ate a TCV provided in the pixel chip 140 and a TCV provided from the pixel chip 140 to the circuit chip 150 are connected on an outer surface of the chip, a so-called shared TCV method in which the both are connected by a TCV penetrating from the pixel chip 140 to the circuit chip 150, or the like can be employed.

However, in a case where the Cu—Cu bonding or the bump bonding is used for the bonding of the pixel chip 140 and the circuit chip 150, the two may be electrically connected via a Cu—Cu bonding section or a bump bonding section.

1.4 Circuit Configuration Example of a Unit Pixel

Figure 5:
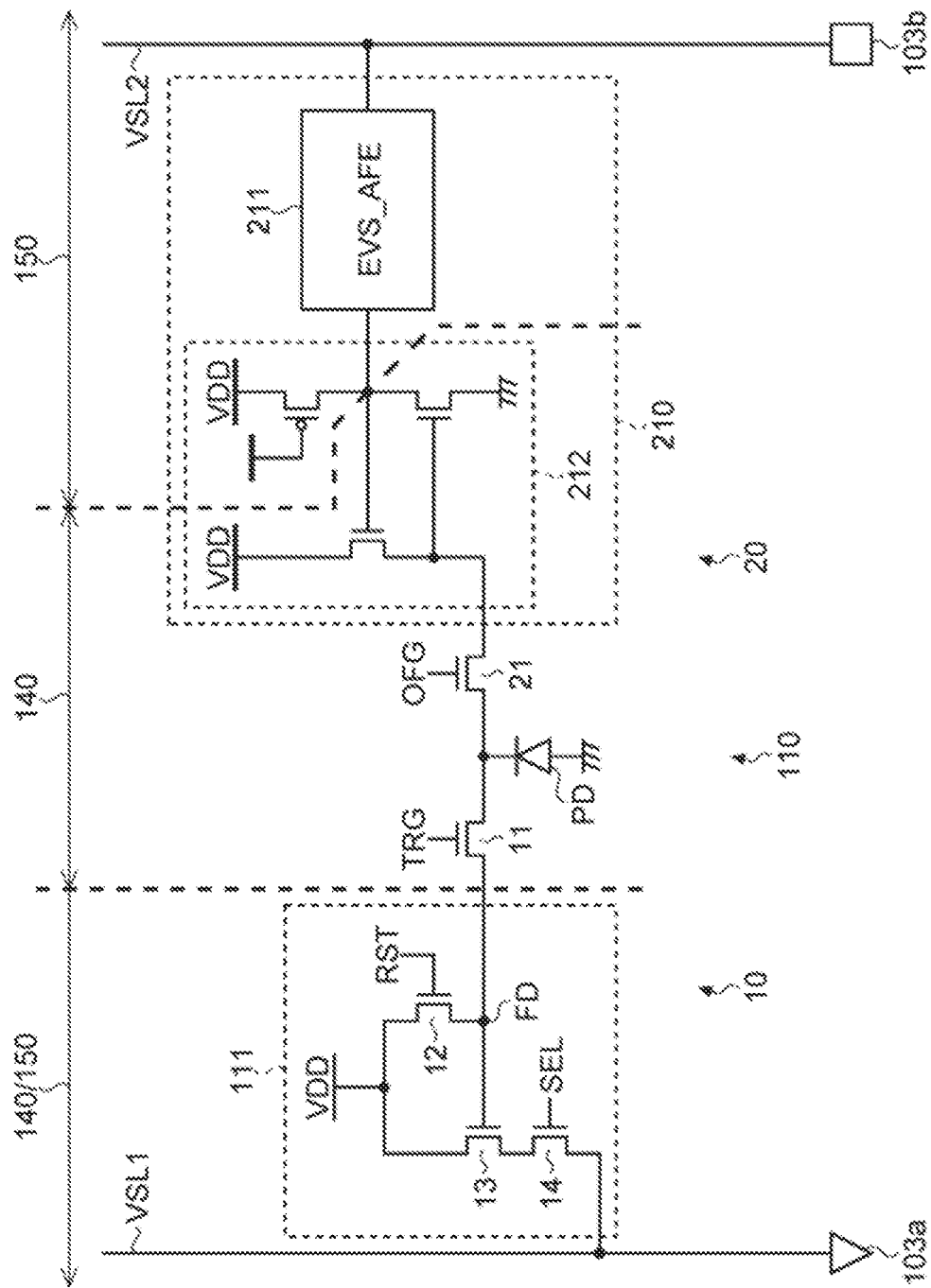
FIG. 5 is a circuit diagram depicting a schematic configuration example of a unit pixel according to the first embodiment.

Next, a circuit configuration example of each of the unit pixels 110 will be described. FIG. 5 is a circuit diagram depicting the schematic configuration example of a unit pixel according to the first embodiment. As illustrated in FIG. 5, the unit pixel 110 includes one luminance pixel 10 and one event pixel 20.

1.4.1 Luminance pixel

The luminance pixel 10 includes, for example, a photoelectric conversion section PD, a transfer transistor 11, a floating diffusion region FD, a reset transistor 12, an amplification transistor 13, and a selection transistor 14.

For example, the photoelectric conversion section PD and the transfer transistor 11 in the luminance pixel 10 may be arranged on the pixel chip 140. On the other hand, the reset transistor 12, the amplification transistor 13, and the selection transistor 14 may be arranged on the pixel chip 140 or may be arranged on the circuit chip 150.

A selection control line included in the pixel driving line LD1 is connected to a gate of the selection transistor 14, a reset control line included in the pixel driving line LD1 is connected to a gate of the reset transistor 12, and a transfer control line included in the pixel driving line LD1 is connected to a gate of the transfer transistor 11. Furthermore, the vertical signal line VSL1 one end of which is connected to the luminance signal processing circuit 103A is connected to a drain of the amplification transistor 13 via the selection transistor 14.

In the present description, the reset transistor 12, the amplification transistor 13, and the selection transistor 14 are also collectively referred to as a pixel circuit 111. This pixel circuit 111 may include the floating diffusion region FD and/or the transfer transistor 11.

For example, the photoelectric conversion section PD photoelectrically converts incident light and generates a charge corresponding to a light quantity (luminance) of the incident light. The transfer transistor 11 transfers the charge generated in the photoelectric conversion section PD. The floating diffusion region FD accumulates the charge transferred by the transfer transistor 11. The amplification transistor 13 causes a luminance signal of a voltage value corresponding to the charge accumulated in the floating diffusion region FD to appear in the vertical signal line VSL1. The reset transistor 12 releases the charge accumulated in the floating diffusion region FD. The selection transistor 14 selects the luminance pixel 10 to be a target of readout.

An anode of the photoelectric conversion section PD is grounded, and a cathode thereof is connected to the transfer transistor 11. The charge flowing out via the transfer transistor 11 is accumulated in the floating diffusion region FD having a wiring structure connecting a source of the reset transistor 12 and a gate of the amplification transistor 13. Note that a drain of the reset transistor 12 may be connected to, for example, a power supply voltage VDD or a power supply line to which a reset voltage lower than the power supply voltage VDD is supplied.

A source of the amplification transistor 13 may be connected to the power supply line via, for example, a constant current circuit (not depicted) or the like. A drain of the amplification transistor 13 is connected to a source of the selection transistor 14, and a drain of the selection transistor 14 is connected to the vertical signal line VSL1.

The floating diffusion region FD converts the accumulated charge into a voltage of a voltage value corresponding to an amount of the charge. Note that the floating diffusion region FD may be, for example, a capacitance-to-ground. However, the floating diffusion region FD is not limited to the above, and may be capacitance or the like added by intentional connection of a capacitor or the like to a node where a drain of the transfer transistor 11, the source of the reset transistor 12, and the gate of the amplification transistor 13 are connected.

The vertical signal line VSL1 is connected to an analog-to-digital (AD) conversion circuit 103a provided for each column (that is, each vertical signal line VSL1) in the luminance signal processing circuit 103A. The AD conversion circuit 103a includes, for example, a comparator and a counter, and converts an analog luminance signal into a digital luminance signal by comparing a reference voltage of a single slope, a ramp shape, or the like which voltage is input from an external reference voltage generation circuit (digital-to-analog converter (DAC)) with the luminance signal that appears in the vertical signal line VSL1. Note that the AD conversion circuit 103a may include, for example, a correlated double sampling (CDS) circuit and the like, and may be configured to be able to reduce a kTC noise and the like.

1.4.2 Event Pixel

The event pixel 20 includes, for example, a photoelectric conversion section PD, a discharge transistor 21, and an address event detection circuit 210. The photoelectric conversion section PD may be the same as the photoelectric conversion section PD of the luminance pixel 10. That is, in the present embodiment, one photoelectric conversion section PD may be shared by the luminance pixel 10 and the event pixel 20. However, this is not a limitation, and a luminance pixel 10 and an event pixel 20 may include separate photoelectric conversion sections. In that case, the discharge transistor 21 may be omitted.

For example, the photoelectric conversion section PD and the discharge transistor 21 in the event pixel 20 may be arranged on the pixel chip 140. On the other hand, the address event detection circuit 210 may be arranged on the circuit chip 150.

The discharge transistor 21 causes a photocurrent flowing out of the photoelectric conversion section PD to flow into the address event detection circuit 210.

As will be described later in detail, the address event detection circuit 210 detects presence or absence of an event on the basis of a change in the photocurrent flowing out of the photoelectric conversion section PD, and outputs, to each of the X arbiter 104A and the Y arbiter 104B, a request for requesting permission to output event data indicating the generation of the event when detecting the event as described above. Then, the address event detection circuit 210 outputs the event data to the vertical driving circuit 102A and the event signal processing circuit 103B in a case of receiving a response indicating the permission to output the event data from each of the X arbiter 104A and the Y arbiter 104B. At that time, the address event detection circuit 210 may include time information indicating a relative time at which the event is generated, such as a time stamp in the event data.

The vertical signal line VSL2 is connected to, for example, a signal processing circuit 103b provided for each column (that is, each vertical signal line VSL2) in the event signal processing circuit 103B.

1.4.2.1 Configuration Example of an Address Event Detection Circuit

Next, a configuration example of the address event detection circuit 210 in the event pixel 20 will be described. The event pixel 20 detects whether an event is generated on the basis of whether a change amount of the photocurrent exceeds a predetermined threshold. The event includes, for example, an on-event indicating that the change amount of the photocurrent exceeds an upper limit threshold and an off-event indicating that the change amount falls below a lower limit threshold. Furthermore, the event data (event information) indicating the generation of the event includes, for example, one bit indicating a detection result of the on-event and one bit indicating a detection result of the off-event. Note that the event pixel 20 can have a configuration having a function of detecting only the on-event, or can have a configuration having a function of detecting only the off-event.

Figure 6:
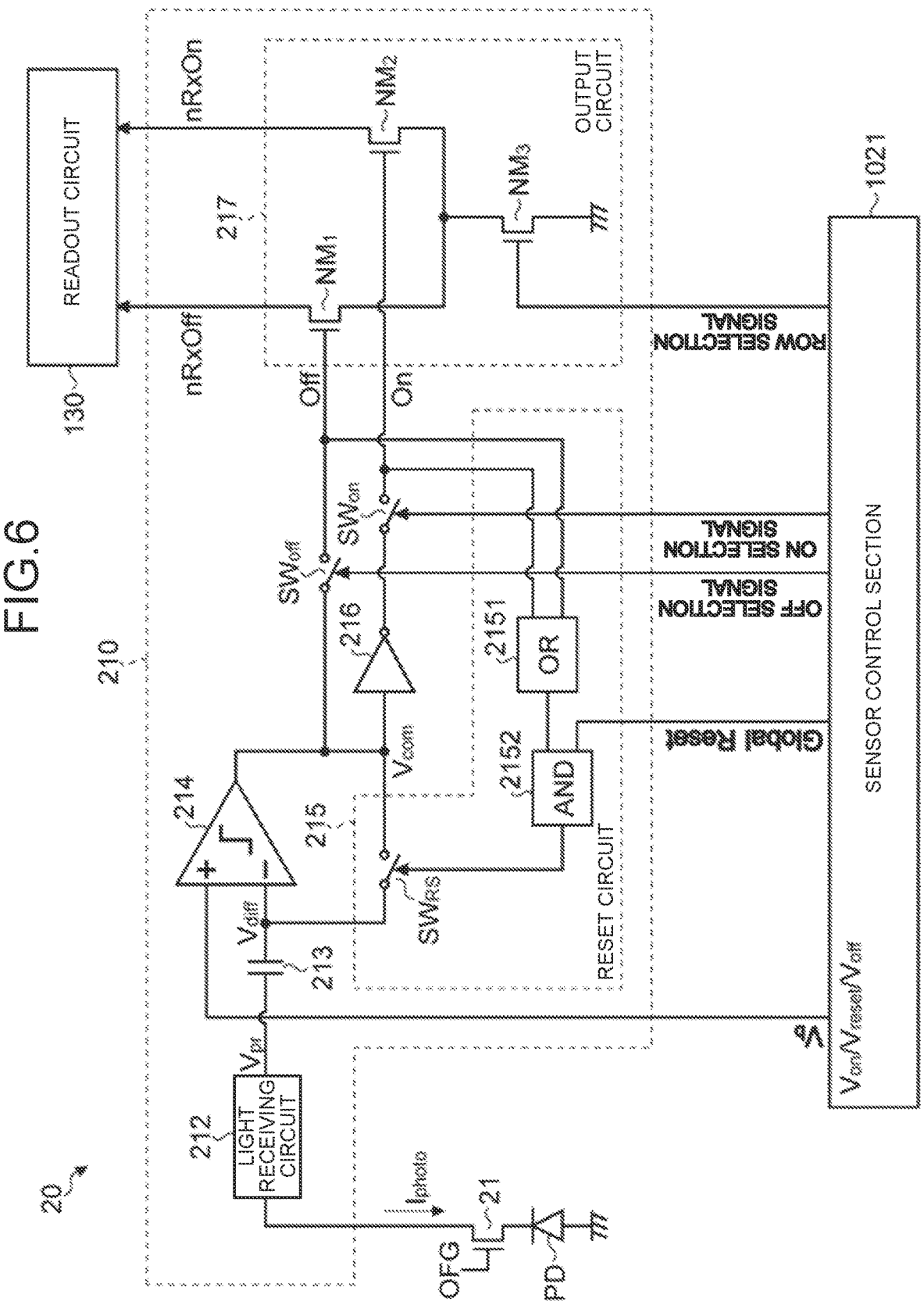
FIG. 6 is a circuit diagram depicting a schematic configuration example of an address event detection circuit according to the first embodiment.

FIG. 6 is a circuit diagram depicting a schematic configuration example of the address event detection circuit according to the present embodiment. Note that a configuration example of a case where one comparator performs detection of the on-event and detection of the off-event in a time division manner is depicted in FIG. 6.

As depicted in FIG. 6, the address event detection circuit 210 includes a light receiving circuit 212, a memory capacitance 213, a comparator 214, a reset circuit 215, an inverter 216, and an output circuit 217.

Although details will be described later, the light receiving circuit 212 includes, for example, a current-voltage conversion circuit in a manner depicted in FIG. 7 or FIG. 8, and converts a photocurrent $I_{photo}$ flowing out of the photoelectric conversion section PD into a voltage $V_{pr}$. Here, a relationship of the voltage $V_{pr}$ with respect to intensity (luminance) of the light is usually a logarithmic relationship. That is, the light receiving circuit 212 converts the photocurrent $I_{photo}$ corresponding to the intensity of the light emitted to a light receiving surface of the photoelectric conversion section PD into the voltage $V_{pr}$ that is a logarithmic function. However, the relationship between the photocurrent $I_{photo}$ and the voltage $V_{pr}$ is not limited to the logarithmic relationship.

The voltage $V_{pr}$ that corresponds to the photocurrent $I_{photo}$ and output from the light receiving circuit 212 passes through the memory capacitance 213 and then becomes an inversion (−) input that is a first input of the comparator 214 as a voltage $V_{diff}$. The comparator 214 usually includes differential pair transistors. The comparator 214 uses a threshold voltage $V_b$ provided from the sensor control section 1021 as a non-inversion (+) input that is a second input, and performs detection of the on-event and detection of the off-event in a time division manner. Furthermore, after the detection of the on-event/off-event, the reset circuit 215 resets the event pixel 20.

The sensor control section 1021 outputs a voltage $V_{on}$ as the threshold voltage $V_b$ at a stage of detecting the on-event, outputs a voltage $V_{off}$ at a stage of detecting the off-event, and outputs a voltage $V_{reset}$ at a stage of performing resetting in a time division manner. The voltage $V_{reset}$ is set to a value between the voltage $V_{on}$ and the voltage $V_{off}$, preferably an intermediate value between the voltage $V_{on}$ and the voltage $V_{off}$. Here, the "intermediate value" means to include not only a case of being the intermediate value strictly but also a case of being substantially an intermediate value, and existence of various variations generated by design or manufacturing is permitted.

Furthermore, the sensor control section 1021 outputs an ON selection signal to the event pixel 20 at a stage of detecting the on-event, outputs an OFF selection signal at a stage of detecting the off-event, and outputs a global reset signal (Global Reset) at a stage of performing resetting. The ON selection signal is provided as a control signal to a selection switch $SW_{on}$ provided between the inverter 216 and the output circuit 217. The OFF selection signal is provided as a control signal to a selection switch $SW_{off}$ provided between the comparator 214 and the output circuit 217.

At a stage of detecting the on-event, the comparator 214 compares the voltage $V_{on}$ with the voltage Vdiff and outputs, as a result of the comparison, on-event information On indicating that a change amount of the photocurrent $I_{photo}$ exceeds the upper limit threshold when the voltage $V_{diff}$ exceeds the voltage $V_{on}$. The on-event information On is inverted by the inverter 216 and then supplied to the output circuit 217 through the selection switch $SW_{on}$.

At the stage of detecting the off-event, the comparator 214 compares the voltage $V_{off}$ with the voltage Vdiff and outputs, as a result of the comparison, off-event information Off indicating that the change amount of the photocurrent $I_{photo}$ becomes lower than the lower limit threshold when the voltage $V_{diff}$ becomes lower than the voltage $V_{off}$. The off-event information Off is supplied to the output circuit 217 through the selection switch $SW_{off}$.

The reset circuit 215 has a configuration including a reset switch $SW_{RS}$, a 2-input OR circuit 2151, and a 2-input AND circuit 2152. The reset switch $SW_{RS}$ is connected between an inversion (−) input terminal and an output terminal of the comparator 214, and selectively perform short-circuit between the inversion input terminal and the output terminal by becoming an on (closed) state.

In the OR circuit 2151, the on-event information On via the selection switch $SW_{on}$ and the off-event information Off via the selection switch $SW_{off}$ are two inputs. With the output signal of the OR circuit 2151 as one input and the global reset signal provided from the sensor control section 1021 as the other input, the AND circuit 2152 turns on (closes) the reset switch $SW_{RS}$ when either the on-event information On or the off-event information Off is detected and the global reset signal is in an active state.

As described above, when the output signal of the AND circuit 2152 becomes the active state, the reset switch $SW_{RS}$ performs short-circuit between the inversion input terminal and the output terminal of the comparator 214, and performs global reset on the event pixel 20. As a result, the reset operation is performed only for the event pixel 20 in which the event is detected.

The output circuit 217 has a configuration including an off-event output transistor $NM_1$, an on-event output transistor $NM_2$, and a current source transistor $NM_3$. The off-event output transistor $NM_1$ has a memory (not depicted) to hold the off-event information Off at a gate section thereof. This memory includes gate parasitic capacitance of the off-event output transistor $NM_1$.

Similarly to the off-event output transistor $NM_1$, the on-event output transistor $NM_2$ has a memory (not depicted) to hold the on-event information On at a gate section thereof. This memory includes gate parasitic capacitance of the on-event output transistor $NM_2$.

At the readout stage, the off-event information Off held in the memory of the off-event output transistor $NM_1$ and the on-event information On held in the memory of the on-event output transistor $NM_2$ are transferred to a readout circuit 130 through an output line nRxOff and an output line nRxOn for each pixel row of the pixel array section 101 when a row selection signal is provided from the sensor control section 1021 to a gate electrode of the current source transistor $NM_3$. The readout circuit 130 is, for example, a circuit provided in the event signal processing circuit 103B (see FIG. 3).

As described above, the event pixel 20 according to a first circuit configuration example has a configuration having an event detecting function of detecting the on-event and detecting the off-event in a time division manner by using the one comparator 214 under the control by the sensor control section 1021.

1.4.2.2 Configuration Example of a Light Receiving Circuit

Figure 7:
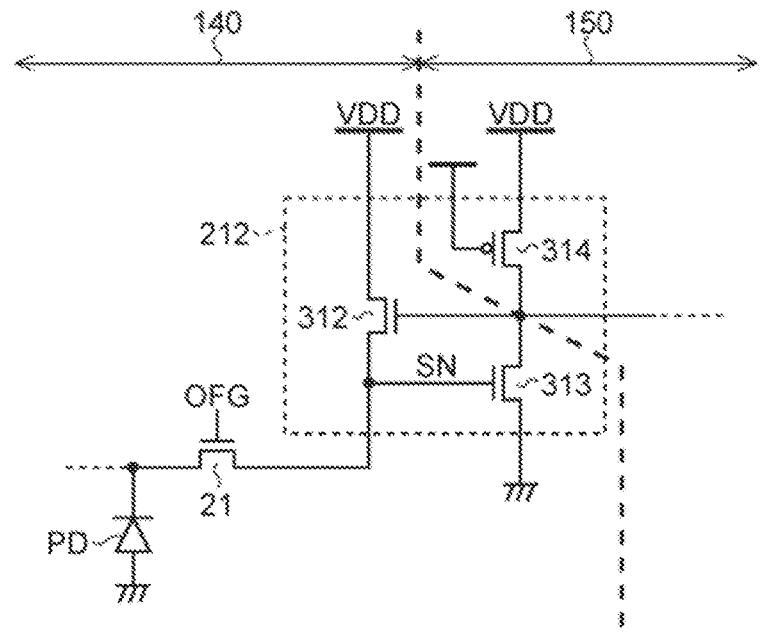
FIG. 7 is a circuit diagram depicting a schematic configuration example of a current-voltage conversion circuit according to the first embodiment.
Figure 8:
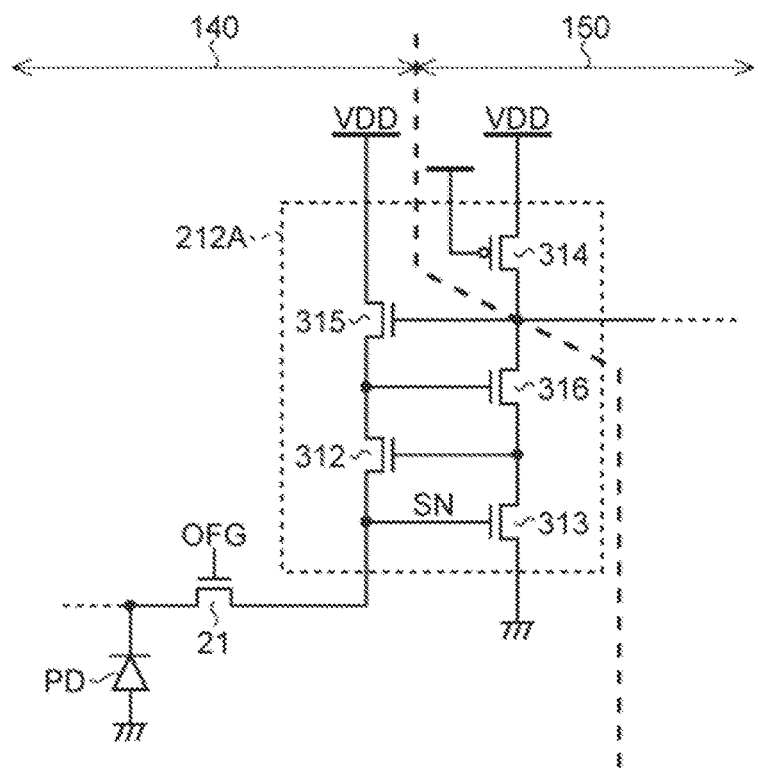
FIG. 8 is a circuit diagram depicting another schematic configuration example of a current-voltage conversion circuit according to the first embodiment.

FIG. 7 is a circuit diagram depicting a basic configuration example of the light receiving circuit according to the present embodiment. As depicted in FIG. 7, the light receiving circuit 212 includes n-channel metal oxide semiconductor (nMOS) transistors 312 and 313 and a p-channel MOS (pMOS) transistor 314. Among these, the two nMOS transistors 312 and 313 are included in, for example, a logarithmic conversion circuit that converts a photocurrent flowing out of the photoelectric conversion section PD into a voltage signal corresponding to a logarithmic value thereof. A wiring line connected to a gate of the nMOS transistor 313 and a wiring line into which the photocurrent from the photoelectric conversion section PD flows function as sense nodes SN of when an event is detected. The nMOS transistor 313 can correspond to, for example, a second transistor in claims, and the nMOS transistor 312 can correspond to, for example, a third transistor in the claims.

Furthermore, the pMOS transistor 314 operates as a load MOS transistor with respect to the logarithmic conversion circuit including the two nMOS transistors 312 and 313. Note that the photoelectric conversion section PD and the nMOS transistors 312 and 313 may be arranged, for example, on the pixel chip 140, and the pMOS transistor 314 may be arranged on the circuit chip 150.

A source of the nMOS transistor 312 is connected to a cathode of the photoelectric conversion section PD, and a drain thereof is connected to a power supply terminal. The pMOS transistor 314 and the nMOS transistor 313 are connected in series between the power supply terminal and a ground terminal. Furthermore, a connection point of the pMOS transistor 314 and the nMOS transistor 313 is connected to a gate of the nMOS transistor 312 and an input terminal of a logic circuit 211, and functions as an output node that outputs a voltage signal VPR to the logic circuit 211. Furthermore, a predetermined bias voltage Vbias1 is applied to a gate of the pMOS transistor 314.

Drains of the nMOS transistors 312 and 313 are connected to a power supply side, and such a circuit is called a source follower. The photocurrent from the photoelectric conversion section PD is converted into the voltage signal VPR corresponding to the logarithmic value thereof by the two source followers connected in a looped manner. Furthermore, the pMOS transistor 314 supplies a constant current to the nMOS transistor 313.

Note that a ground of the pixel chip 140 and a ground of the circuit chip 150 may be separated from each other for countermeasures against interference.

1.4.2.3 Modification Example of a Light Receiving Circuit

Although the source follower-type light receiving circuit 212 has been described in FIG. 7, such a configuration is not a limitation. FIG. 8 is a circuit diagram depicting a basic configuration example of a light receiving circuit according to a modification example of the present embodiment. As depicted in FIG. 8, a light receiving circuit 212A according to the modification example includes, for example, a so-called gain boost-type circuit configuration in which an nMOS transistor 315 connected in series between an nMOS transistor 312 and a power supply line and an nMOS transistor 316 connected in series between an nMOS transistor 313 and a pMOS transistor 314 are added to the source follower-type light receiving circuit 212 depicted in FIG. 7. The four nMOS transistors 312, 313, 315, and 316 are included, for example, in a logarithmic conversion circuit that converts a photocurrent flowing out of a photoelectric conversion section PD into a voltage signal VPR corresponding to a logarithmic value thereof.

As described above, even in a case where the gain boost-type light receiving circuit 212A is used, it is possible to convert the photocurrent from the photoelectric conversion section PD into the voltage signal VPR having a logarithmic value corresponding to an amount of charge thereof.

1.4.3 Modification Example Related to Pixel Sharing

Figure 9:
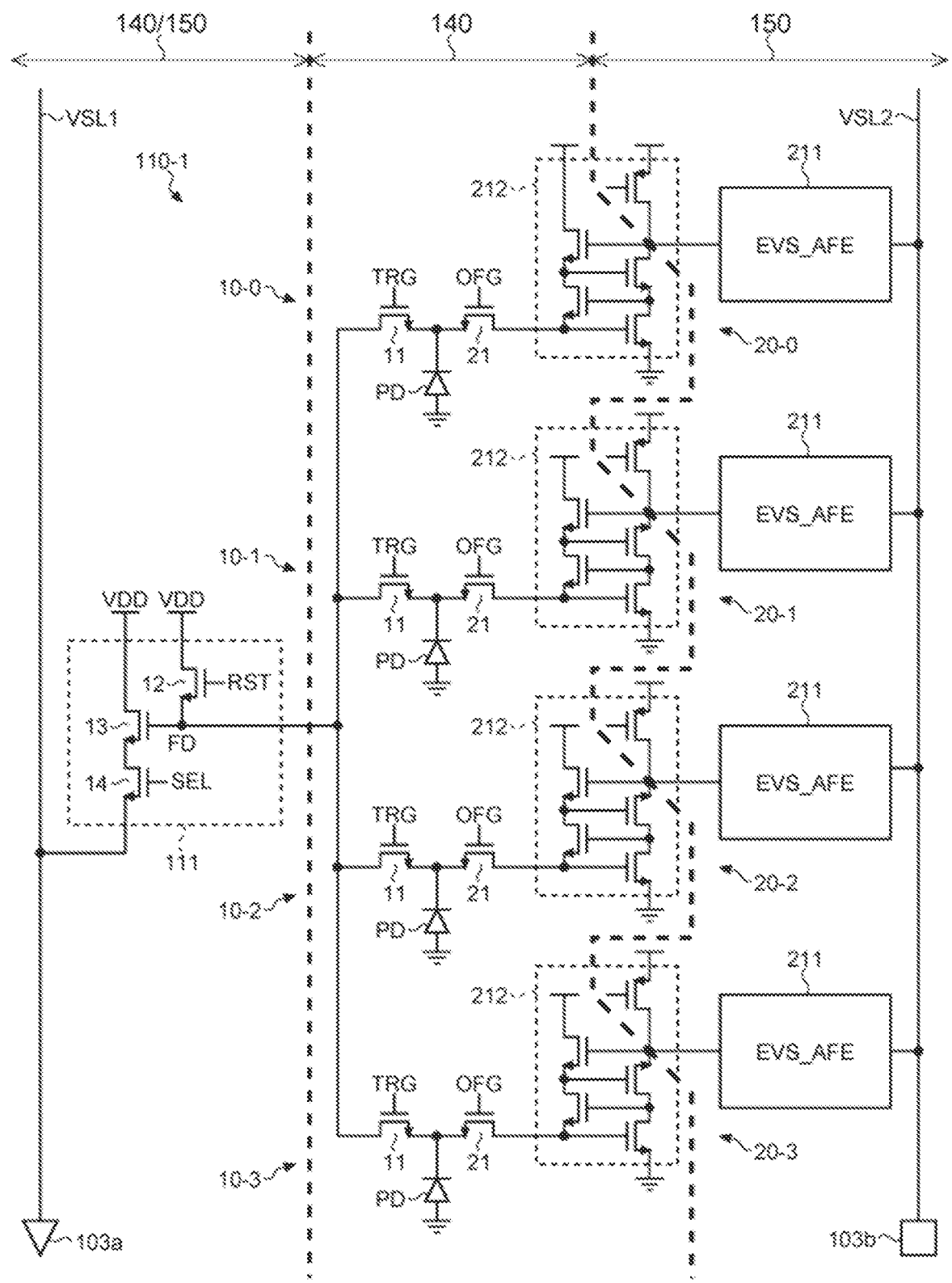
FIG. 9 is a circuit diagram depicting a schematic configuration example of a unit pixel according to a modification example of the first embodiment.

FIG. 9 is a circuit diagram depicting a schematic configuration example of a unit pixel according to the modification example of the first embodiment. As depicted in FIG. 9, a unit pixel 110-1 according to the modification example includes a plurality of (four in FIG. 9) luminance pixels 10-0 to 10-3 and a plurality of (four in FIG. 9) event pixels 20-0 to 20-3. For example, the plurality of luminance pixels 10-0 to 10-3 and the plurality of event pixels 20-0 to 20-3 may be arrayed in a matrix pattern of M×N (M and N are integers of 1 or larger) in a pixel array section 101.

In such a configuration, in the unit pixel 110-1, a plurality of luminance pixels 10-1 to 10-4 included in the unit pixel 110-1 may share one pixel circuit 111. As a result, it is possible to perform switching between an operation mode in which one photoelectric conversion section PD is included in one pixel and an operation mode in which a plurality of photoelectric conversion sections PD is included in one luminance pixel (such as high dynamic range (HDR)).

1.5 Chip Layout Example

Next, layouts of each of the pixel chip 140 and the circuit chip 150 according to the present embodiment will be described with some examples.

1.5.1 First Layout Example

Figure 10:
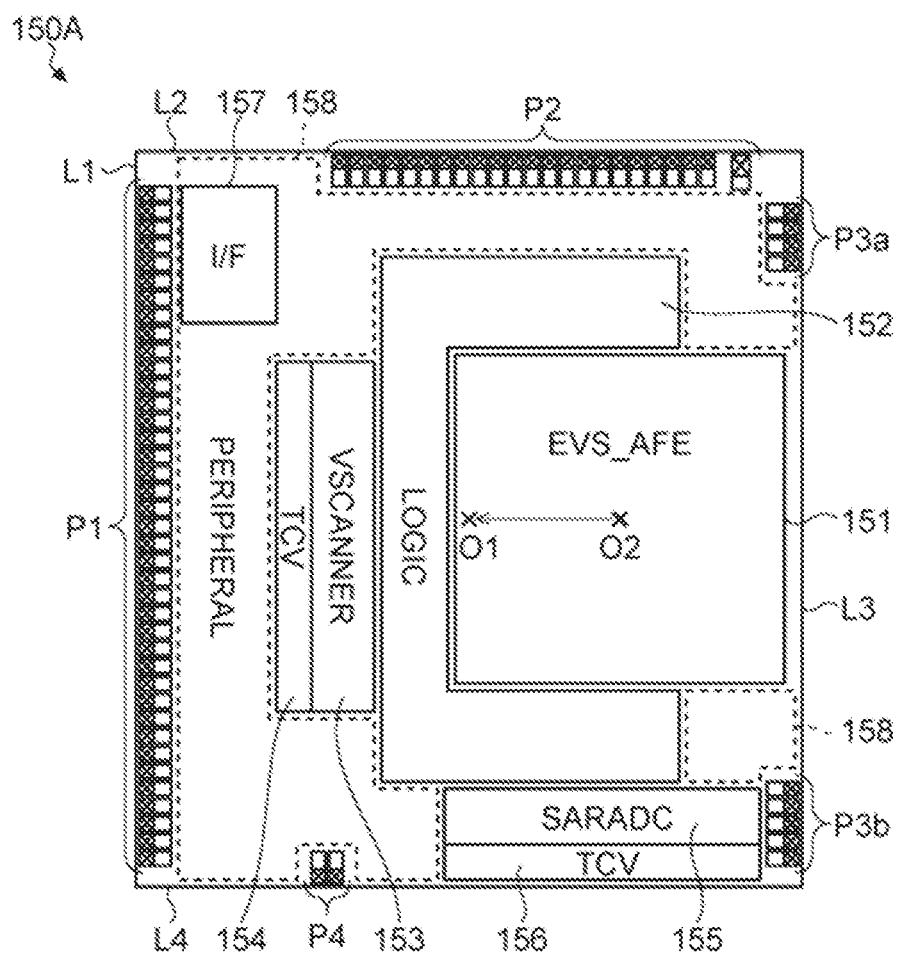
FIG. 10 is a plan view depicting a layout example of a circuit chip according to a first layout example of the first embodiment.
Figure 11:
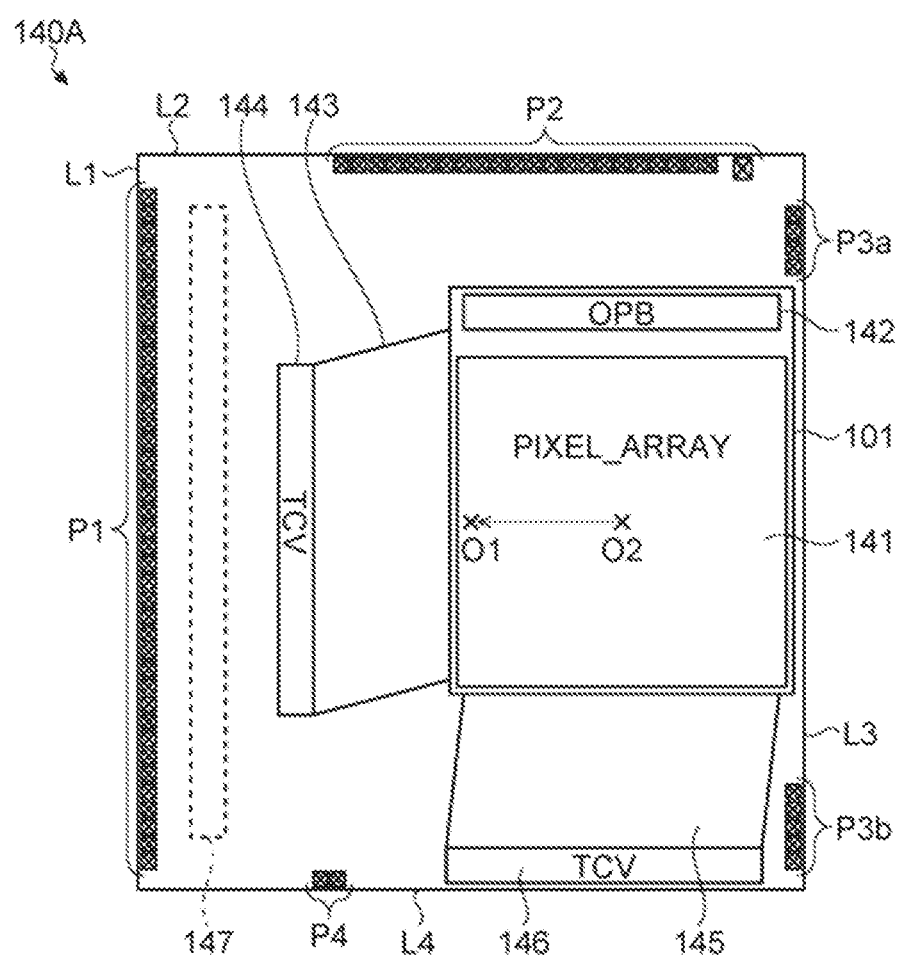
FIG. 11 is a plan view depicting a layout example of a pixel chip according to a first layout example of the first embodiment.

FIG. 10 and FIG. 11 are plan views depicting an example of a chip layout according to the first layout example of the present embodiment, a layout example of a circuit chip 150A being depicted in FIG. 10, and a layout example of a pixel chip 140A being depicted in FIG. 11.
(Circuit Chip)

As depicted in FIG. 10, the circuit chip 150A according to the first layout example includes, for example, an EVS analog front end circuit (hereinafter, referred to as EVS_AFE) 151, a logic circuit (LOGIC) 152, a vertical driving circuit (VSCANNER) 153, a successive approximation-type analog-digital conversion circuit (hereinafter, referred to as SARADC) 155, an interface section (I/F) 157, a peripheral circuit 158, and connection sections (through contact via (TCV)) 154 and 156.

The EVS_AFE 151 has, for example, a configuration in which a part of an address event detection circuit 210 in the event pixel 20 described above (see, for example, the logic circuit (EVS_AFE) 211 in FIG. 9 and the pMOS transistor 314 (see FIG. 7 or FIG. 8)) is arrayed in a two-dimensional lattice pattern and which is included in a part of the pixel array section 101 described above (see FIG. 3).

The logic circuit 152 includes, for example, the horizontal driving circuit 102B, the event signal processing circuit 103B, the X arbiter 104A, the Y arbiter 104B, the luminance data processing section 108A, the event data processing section 108B, and the like in the configuration depicted in FIG. 3, and executes control on a luminance pixel 10 and an event pixel 20, processing on signals read from the luminance pixel 10 and the event pixel 20, and the like. This logic circuit 152 may be arranged adjacent to the EVS_AFE 151. Furthermore, the logic circuit 152 may include a storage section such as a static random access memory (SRAM).

The vertical driving circuit 153 corresponds to, for example, the vertical driving circuit 102A depicted in FIG. 3. The connection section 154 arranged adjacent to the vertical driving circuit 153 may be a through electrode to route pixel driving lines LD1 and LD2 from the vertical driving circuit 153 to the pixel chip 140A. This vertical driving circuit 153 may be arranged in a direction vertical to a column direction of the pixel array section 101 in the pixel chip 140A (horizontal direction (lateral direction in the drawing)).

The SARADC 155 is, for example, the luminance signal processing circuit 103A depicted in FIG. 3 or a part thereof (AD conversion function), and converts an analog luminance signal read from the luminance pixel 10 into a digital signal. Note that it is not essential that the AD conversion function of the luminance signal processing circuit 103A is the SARADC, and may be modified in various manners and be an ADC that converts an analog luminance signal into a digital signal by comparing a single-slope or ramp-shaped reference voltage and the luminance signal. The connection section 156 arranged adjacent to the SARADC 155 may be a through electrode to route vertical signal lines VSL1 and VSL2 in the pixel chip 140A to the circuit chip 150A. Furthermore, the SARADC 155 may be arranged in the column direction (vertical direction (longitudinal direction in the drawing)) of the pixel array section 101 in the pixel chip 140A.

The peripheral circuit 158 may include, for example, various peripheral circuits such as a thermometer in addition to the system control circuit 105 depicted in FIG. 3.

The interface section 157 may be, for example, an interface conforming to a standard such as MIPI, and outputs various kinds of data (such as image frame data and event frame data) processed by the logic circuit 152 and/or the peripheral circuit 158 to the outside. This interface section 157 may be arranged in the vicinity of a main pad P1 described later. At that time, by laying out functional blocks of the logic circuit 152 in such a manner that an output end of the logic circuit 152 is in the vicinity of the interface section 157, it is possible to achieve effects such as an increase in a speed of a signal output and a reduction in propagation loss.
(Pixel Chip)

As depicted in FIG. 11, the pixel chip 140A according to the first layout example includes, for example, a pixel array section 101 (excluding EVS_AFE 151), connection sections 144 and 146, and wiring sections 143 and 145.

The pixel array section 101 is, for example, the pixel array section 101 depicted in FIG. 3 (excluding a part of the address event detection circuit 210 (see, for example, FIG. 9)), and includes an effective pixel region (PIXEL_ARRAY) 141 and a light-shielded pixel region (optical black (OPB)) 142. The effective pixel region 141 is at least a region in which the photoelectric conversion sections PD in the luminance pixel 10 and the event pixel 20 are arrayed in a two-dimensional lattice pattern. The light-shielded pixel region 142 may be, for example, a region in which pixels having photoelectric conversion sections PD shielded from light are arrayed in a configuration equivalent to those of the luminance pixel 10 and the event pixel 20. This light-shielded pixel region 142 may be arranged at a head or an end in the column direction (column direction (longitudinal direction in FIG. 11)) with respect to the effective pixel region 141.

Furthermore, the effective pixel region 141 may be arranged in a region corresponding to the EVS_AFE 151 depicted in FIG. 10 in a substrate thickness direction. As a result, in a stack structure in which the pixel chip 140A and the circuit chip 150A are stacked vertically, each event pixel 20 in the pixel chip 140A and each address event detection circuit 210 in the EVS_AFE 151 of the circuit chip 150A can be aligned.

For example, the connection section 144 is a configuration to be continuous with or connected to the connection section 154 in the circuit chip 150A. The connection section 146 is a configuration to be continuous with or connected to the connection section 156 in the circuit chip 150A. Furthermore, the wiring section 143 may be a part of the pixel driving lines LD1 and LD2, and the wiring section 145 may be a part of the vertical signal lines VSL1 and VSL2.

In the above-described configuration, in the first layout example, a pad used for connection with the outside (hereinafter, also referred to as a main pad) P1 is arrayed in the vicinity of one chip end L1 of four chip ends L1 to L4. As a result, it becomes possible to simplify a connection configuration such as a flexible cable that connects the outside and the solid imaging device 100. Thus, it is possible to improve efficiency of a design, assembling work, and the like of the connection configuration. Note that the chip end L1 may be substantially perpendicular to each of the chip ends L2 and L3, and the chip ends L2 and L3, and the chip end L1 and the chip end L4 may be substantially parallel to each other respectively, for example. That is, the pixel chip 140 and the circuit chip 150 may have rectangular shapes of the same size.

In addition, a pad for a text (hereinafter, also referred to as a test pad) P2, spare or auxiliary power supply pads (hereinafter, also referred to as spare power supply pads) P3a, P3b, and P4, and the like may be arranged at the other chip ends L2 to L4 of the circuit chip 150A. For example, the spare power supply pad P3b may be used as an auxiliary power supply pad that controls a power drop of the SARADC 155.

Note that the main pad P1 includes a signal pad to control the solid imaging device 100 (image sensor and EVS), a power supply pad to supply power to each section, and the like. By arranging this main pad P1 close to the one chip end L1, the pixel array section 101 (including the EVS_AFE 151) is arranged close to the chip end L3 on an opposite side of the chip end L1 in the first layout example. Furthermore, in the circuit chip 150A, the vertical driving circuit 153 and the connection section 154 are arranged between the main pad P1 and the EVS_AFE 151, and the SARADC 155 and the connection section 156 are arranged at a chip end orthogonal to the chip end L1 in the vicinity of which the main pad P1 is arranged (chip end L4 in the present example).

By employing such a layout, it becomes possible to shorten wiring lengths of the vertical signal lines VSL1 and VSL2 to transmit the luminance signal and the event data read from the luminance pixel 10 and the event pixel 20 while shortening wiring lengths of the pixel driving lines LD1 and LD2 to drive the luminance pixel 10 and the event pixel 20, whereby it becomes possible to control a decrease in an SN ratio due to propagation loss or the like. In addition, by arranging the spare power supply pad P3b in the vicinity of the SARADC 155, it becomes also possible to control a drop of the reference voltage, whereby it becomes also possible to generate a more accurate digital value of the luminance signal. Furthermore, by arranging the spare power supply pad P2a in the vicinity of the logic circuit 152, it becomes also possible to reinforce the power supply to the logic circuit 152. Note that the test pad P2 is not limited to an operation test or the like of the solid imaging device 100, and may be used as a spare or auxiliary pad.

Furthermore, in the first layout example, since a layout in which a center O2 of the effective pixel region 141 is shifted only in the horizontal direction (X direction (lateral direction in the drawing)) with respect to a chip center O1 can be employed, there is also an advantage that alignment with an imaging lens 1040 (see FIG. 1) arranged to face the light receiving surface of the solid imaging device 100 is easy.

1.5.2 Second Layout Example

Figure 12:
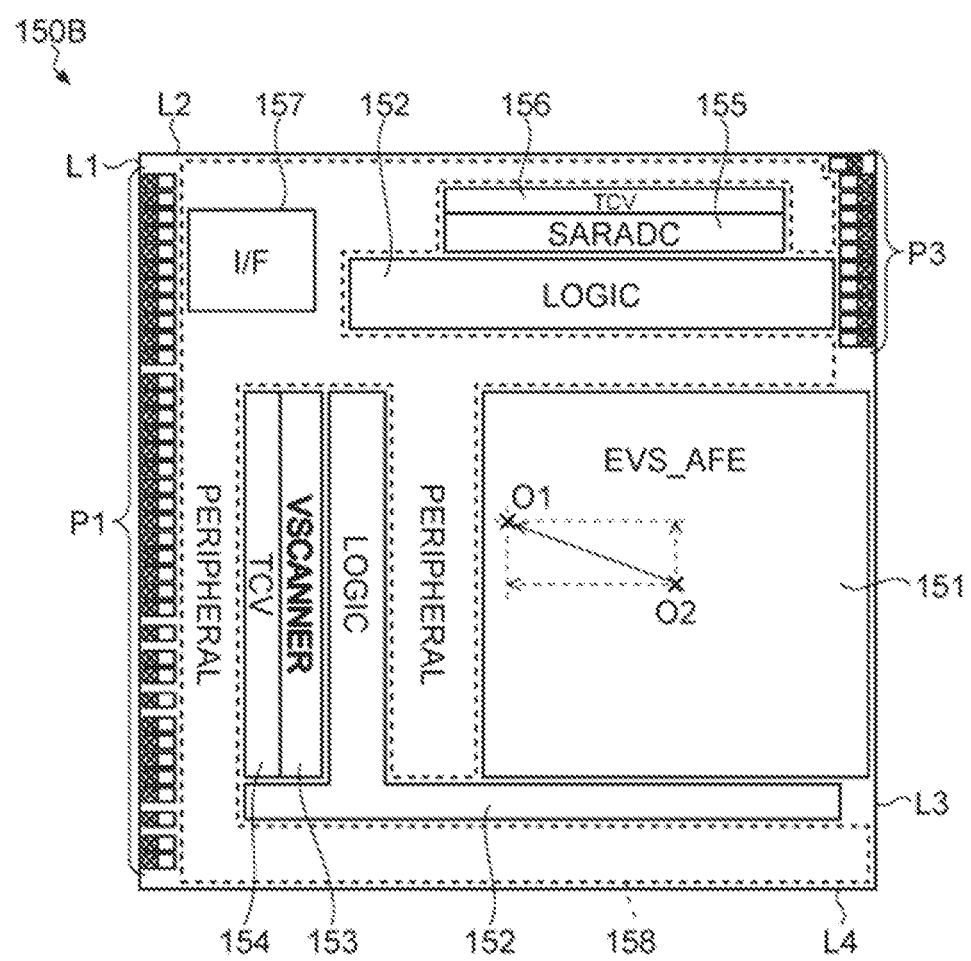
FIG. 12 is a plan view depicting a layout example of a circuit chip according to a second layout example of the first embodiment.

FIG. 12 is a plan view depicting an example of a chip layout according to the second layout example of the present embodiment, and is a diagram depicting a layout example of a circuit chip 150B. Note that since a layout example of a pixel chip 140 according to the second layout example can be easily conceived from the layout example of the circuit chip 150B (described later) and the first layout example described above, a description thereof will be omitted here.
(Circuit Chip)

As depicted in FIG. 12, the circuit chip 150B according to the second layout example has a configuration in which a test pad P2 is omitted, a spare power supply pad P3 is put together at a chip end L3 on an opposite side of a chip end L1 at which a main pad P1 is arranged, and arrangement of an EVS_AFE 151, a logic circuit 152, a vertical driving circuit 153, an SARADC 155, connection sections 154 and 156, an interface section 157, and a peripheral circuit 158 is further optimized in a configuration similar to that of the circuit chip 150A according to the first layout example depicted in FIG. 10.

By employing such a layout, it becomes possible to shorten wiring lengths of the vertical signal lines VSL1 and VSL2 to transmit the luminance signal and the event data read from the luminance pixel 10 and the event pixel 20 while shortening wiring lengths of the pixel driving lines LD1 and LD2 to drive the luminance pixel 10 and the event pixel 20, whereby it becomes possible to control a decrease in an SN ratio due to propagation loss or the like. In addition, by arranging the spare power supply pad P3b in the vicinity of the SARADC 155, it becomes also possible to control a drop of the reference voltage, whereby it becomes also possible to generate a more accurate digital value of the luminance signal.

Furthermore, by arranging the spare power supply pad P2a in the vicinity of the logic circuit 152, it becomes also possible to reinforce the power supply to the logic circuit 152. Note that the test pad P2 is not limited to an operation test or the like of the solid imaging device 100, and may be used as a spare or auxiliary pad.

1.5.3 Third Layout Example

Figure 13:
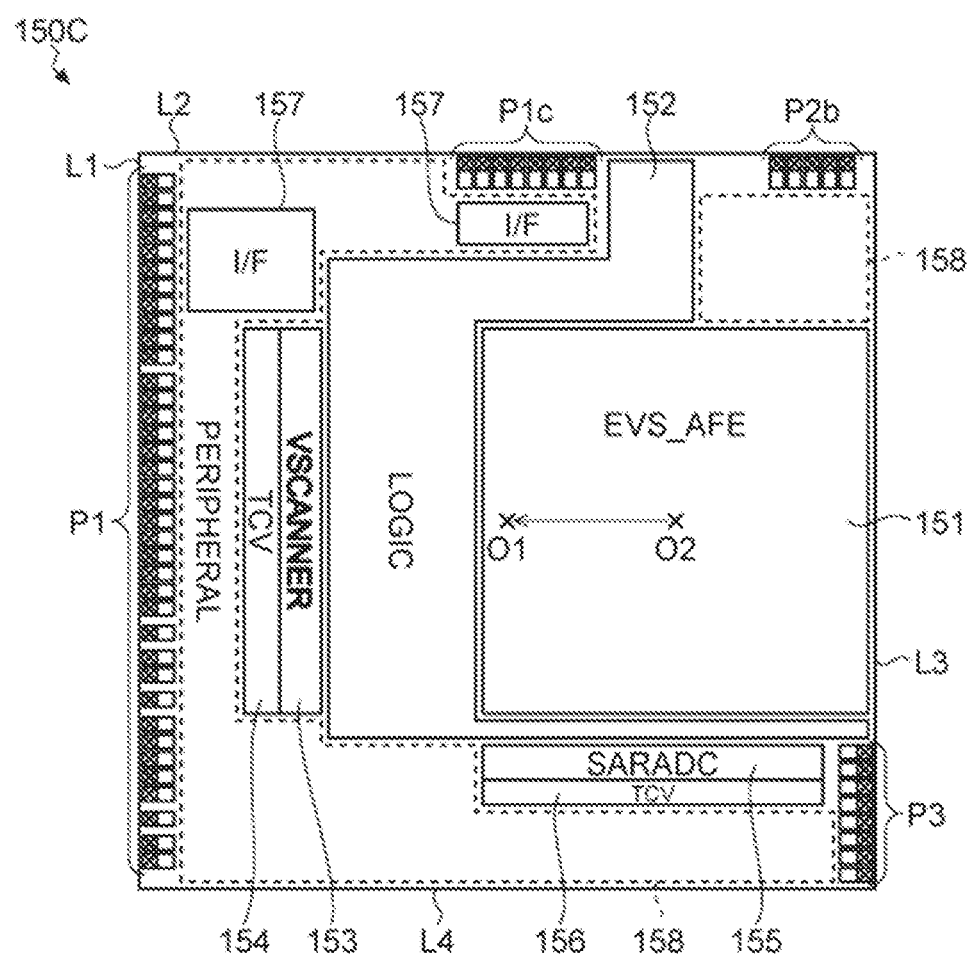
FIG. 13 is a plan view depicting a layout example of a circuit chip according to a third layout example of the first embodiment.

FIG. 13 is a plan view depicting an example of a chip layout according to the third layout example of the present embodiment, and is a diagram depicting a layout example of a circuit chip 150C. Note that since a layout example of a pixel chip 140 according to the third layout example can be easily conceived from the layout example of the circuit chip 150C (described later) and the first layout example described above, a description thereof will be omitted here.
(Circuit Chip)

As depicted in FIG. 13, in the circuit chip 150C according to the third layout example, a configuration in which an interface section 157 is divided into an interface section 157a to output image frame data and an interface section 157*b* to output event frame data, and the interface section 157*a* and a main pad P1*c* (part of a main pad P1) connected thereto are arranged at a chip end different from a chip end L1 at which the main pad P1 is arranged (in this example, a chip end L2) in a configuration similar to that of the circuit chip 150B according to the second layout example depicted in FIG. 12 is included. However, in the third layout example, a part of a spare power supply pad P2*b* may be arranged at the chip end L2.

According to such a layout, although a restriction that the main pad P1 is aggregated at the one chip end L1 is released, a degree of freedom with respect to the arrangement of each section can be increased. Thus, for example, it is possible to achieve a layout in which a center O2 of an effective pixel region 141 is shifted only in a horizontal direction with respect to a chip center O1 while controlling an increase in a chip size.

1.5.4 Fourth Layout Example

Figure 14:
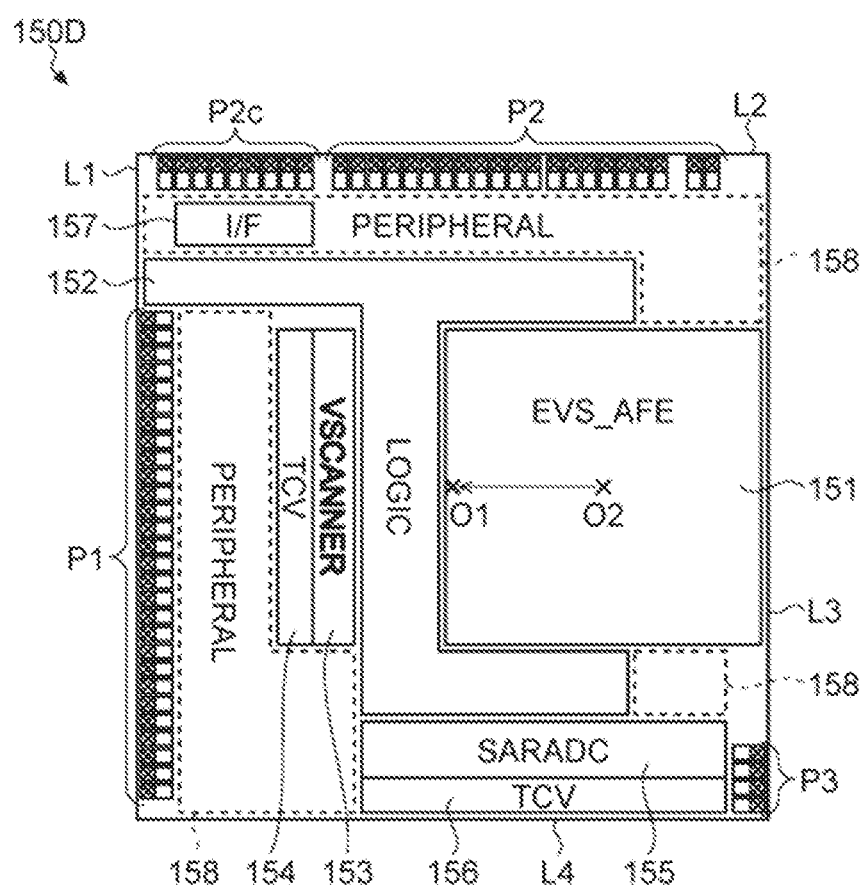
FIG. 14 is a plan view depicting a layout example of a circuit chip according to a fourth layout example of the first embodiment.

FIG. 14 is a plan view depicting an example of a chip layout according to the fourth layout example of the present embodiment, and is a diagram depicting a layout example of a circuit chip 150D. Note that since a layout example of a pixel chip 140 according to the fourth layout example can be easily conceived from the layout example of the circuit chip 150D (described later) and the first layout example described above, a description thereof will be omitted here.
(Circuit Chip)

As depicted in FIG. 14, in the circuit chip 150D according to the fourth layout example, a configuration in which an interface section 157 is arranged in such a manner as to face a chip end different from a chip end L1 where a main pad P1 is arranged (in this example, a chip end L2), and an output pad P2*c* of the main pad P1 is arranged at the chip end L2 to which the interface section 157 faces in a configuration similar to that of the circuit chip 150A according to the first layout example depicted in FIG. 10 is included.

According to such a layout, a restriction that the main pad P1 is aggregated at the one chip end L1 is further relaxed, and a degree of freedom with respect to the arrangement of each section can be increased. Thus, for example, it is possible to achieve a layout in which a center O2 of an effective pixel region 141 is shifted only in a horizontal direction with respect to a chip center O1 while controlling an increase in a chip size.

1.5.5 Fifth Layout Example

Figure 15:
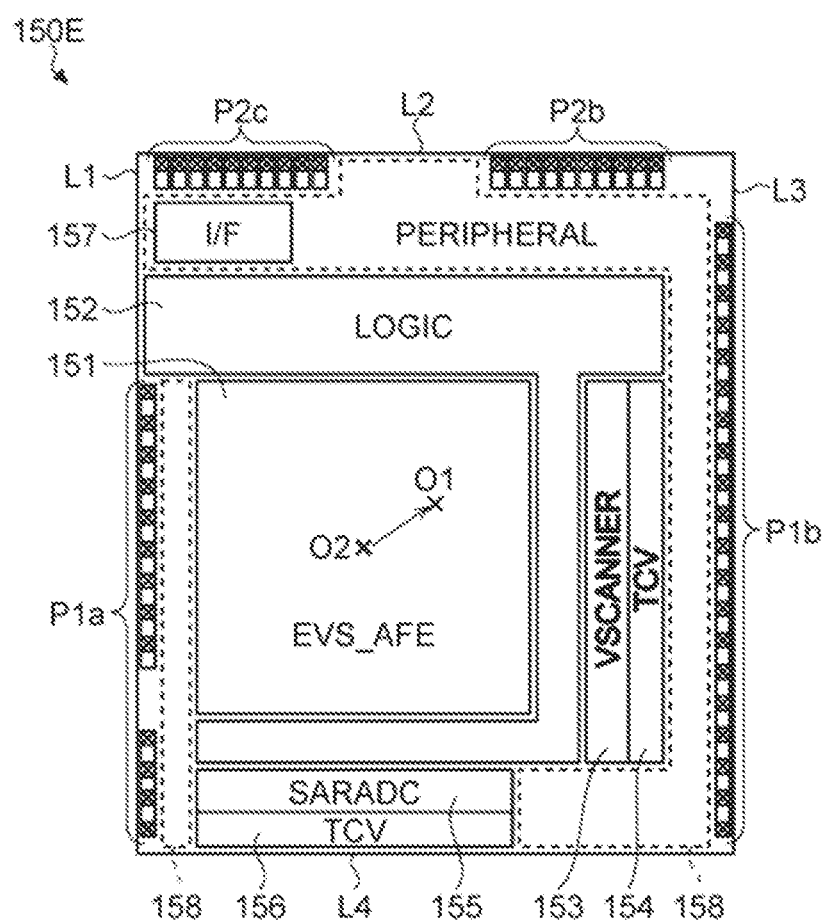
FIG. 15 is a plan view depicting a layout example of a circuit chip according to a fifth layout example of the first embodiment.

FIG. 15 is a plan view depicting an example of a chip layout according to the fifth layout example of the present embodiment, and is a diagram depicting a layout example of a circuit chip 150E. Note that since a layout example of a pixel chip 140 according to the fifth layout example can be easily conceived from the layout example of the circuit chip 150E (described later) and the first layout example described above, a description thereof will be omitted here.
(Circuit Chip)

As depicted in FIG. 15, in the circuit chip 150E according to the fifth layout example, a configuration in which a test pad P2 is omitted, a main pad P1 is divided into a main pad P1*a* arranged at a chip end L1 and a main pad P1*b* arranged at a chip end different from the chip end L1 (chip end L3 in the present example), and arrangement of an EVS_AFE 151, a logic circuit 152, a vertical driving circuit 153, an SARADC 155, connection sections 154 and 156, an interface section 157, and a peripheral circuit 158 is further optimized in a configuration similar to that of the circuit chip 150D according to the fourth layout example depicted in FIG. 14 is included. However, in the third layout example, a spare power supply pad P2*b* may be aggregated at a chip end L2.

The main pad P1*a* arranged in the vicinity of the chip end L1 may be, for example, a pad (including a signal pad and a power supply pad) connected to a section included in an EVS in a solid imaging device 100, and the main pad P1*b* arranged in the vicinity of the chip end L3 may be, for example, a pad (including a signal pad and a power supply pad) connected to each section included in an image sensor in the solid imaging device 100.

Alternatively, the main pad P1*a* may be, for example, a signal pad which inputs a signal to each of sections of the solid imaging device 100 or to which a signal is output from each of the sections, and the main pad P1*b* may be, for example, a power supply pad that supplies power to each of the sections of the solid imaging device 100.

Alternatively, the main pad P1*a* may be, for example, a pad (including a signal pad and a power supply pad) connected to an analog circuit in the solid imaging device 100, and the main pad P1*b* may be, for example, a pad (including the signal pad and the power supply pad) connected to a logic circuit in the solid imaging device 100.

As described above, the combination of the main pads P1*a* and P1*b* may be changed in various manners.

According to such a layout, a restriction that the main pad P1 is aggregated at one chip end L1 is further relaxed, and a degree of freedom with respect to the arrangement of each section can be increased. Thus, for example, it is possible to achieve a layout in which a center O2 of an effective pixel region 141 becomes closer to a chip center O1 while controlling an increase in a chip size.

1.6 Conclusion

As described above, according to the present embodiment, the circuit configurations and the light receiving element can be suitably laid out.

For example, the main pad P1 used for connection with the outside is aggregated at one chip end L1, whereby it becomes possible to simplify the connection configuration such as the flexible cable that connects the outside and the solid imaging device 100, and to improve efficiency of designing, assembling work, and the like of the connection configuration. At that time, by laying out functional blocks of the logic circuit 152 in such a manner that an output end of the logic circuit 152 is in the vicinity of the interface section 157, it is possible to achieve effects such as an increase in a speed of a signal output and a reduction in propagation loss.

Furthermore, by arranging the logic circuit 152 in such a manner as to surround the EVS_AFE 151 in a region adjacent to the EVS_AFE 151, and further arranging the vertical driving circuit 153 outside thereof, it becomes possible to shorten the wiring lengths of the vertical signal lines VSL1 and VSL2, which transmit the luminance signal and the event data read from the luminance pixel 10 and the event pixel 20, while shortening the wiring lengths of the pixel driving lines LD1 and LD2 to drive the luminance pixel 10 and the event pixel 20. Thus, it becomes possible to control a decrease in an SN ratio due to propagation loss or the like. In addition, by arranging the spare power supply pad P3*b* in the vicinity of the SARADC 155, it becomes also possible to control a drop of the reference voltage, whereby it becomes also possible to generate a more accurate digital value of the luminance signal. Furthermore, by arranging the spare power supply pad P2a in the vicinity of the logic circuit 152, it becomes also possible to reinforce the power supply to the logic circuit 152.

Furthermore, in a case where a restriction that the main pad is aggregated at the one chip end L1 is released, it becomes possible to increase a degree of freedom with respect to arrangement of each section. Thus, for example, it becomes possible to suitably adjust the center O2 of the effective pixel region 141 and the chip center O1 while controlling an increase in the chip size.

1.7 Modification Example

In the above description, as described with reference to FIG. 4, a case where the solid imaging device 100 has a two-layer stack structure has been described as an example. However, the stack structure of the solid imaging device 100 is not limited to two layers, and may be three or more layers.

1.7.1 Stacked Structure Example of a Solid Imaging Device

Figure 16:
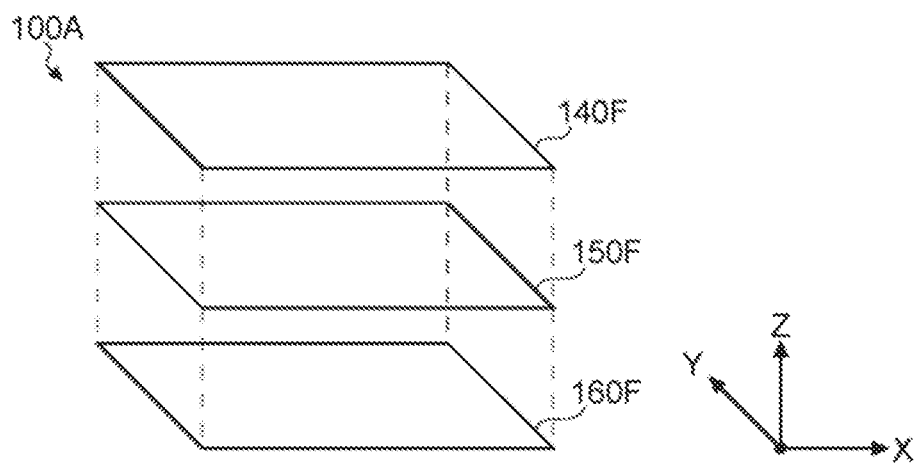
FIG. 16 is a diagram depicting a stacked structure example of a solid imaging device according to a modification example of the first embodiment.

FIG. 16 is a diagram depicting a stacked structure example of a solid imaging device according to the modification example of the first embodiment. As depicted in FIG. 16, a solid imaging device 100A according to the modification example has a three-layer structure in which a pixel chip 140F, a first circuit chip 150F, and a second circuit chip 160F are vertically stacked. That is, in the solid imaging device 100A, the circuit chip 150 in the solid imaging device 100 is further divided into the first circuit chip 150F and the second circuit chip 160F.

Bonding and electrical connection between the pixel chip 140F and the first circuit chip 150F may be similar to those of the pixel chip 140 and the circuit chip 150 described above. Similarly, for example, direct bonding, Cu—Cu bonding, bump bonding, or the like may be used for the bonding between the first circuit chip 150F and the second circuit chip 160F, and a connection section such as a TCV, a Cu—Cu bonding section, a bump bonding section, or the like may be used for electrical connection, for example.

1.7.2 Chip Layout Example

Figure 17:
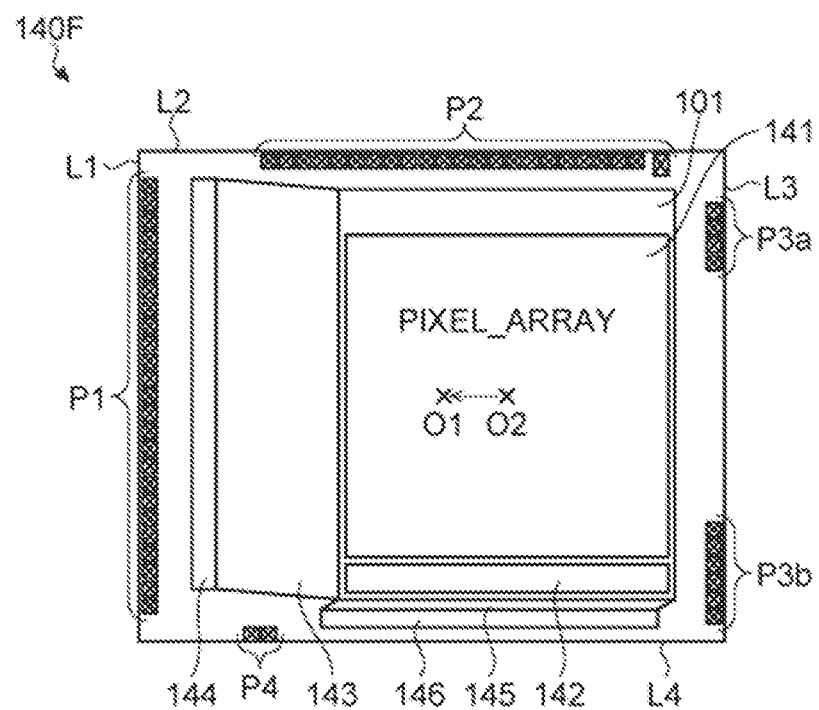
FIG. 17 is a plan view depicting a layout example of a pixel chip according to the modification example of the first embodiment.
Figure 18:
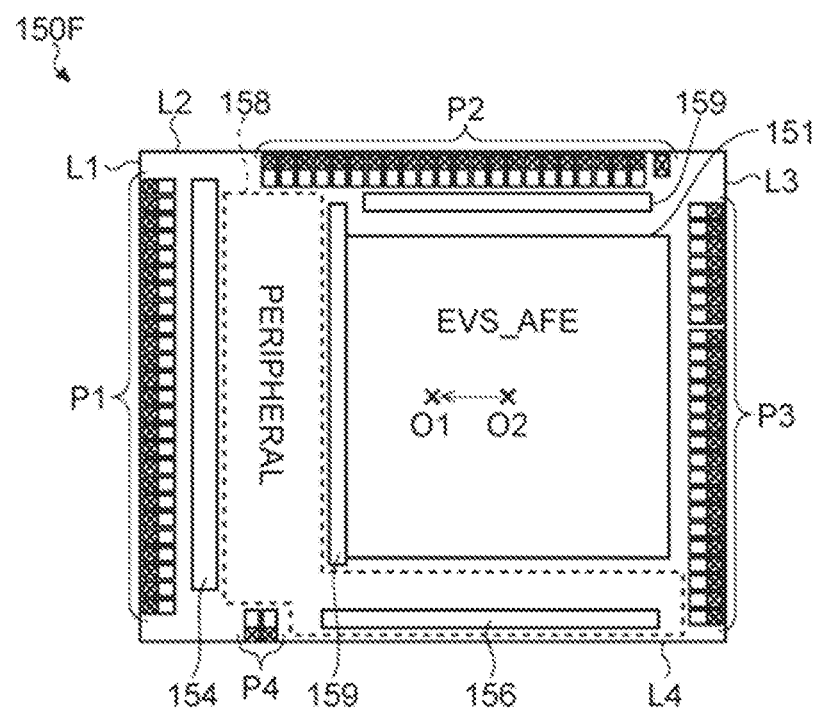
FIG. 18 is a plan view depicting a layout example of a first circuit chip according to the modification example of the first embodiment.
Figure 19:
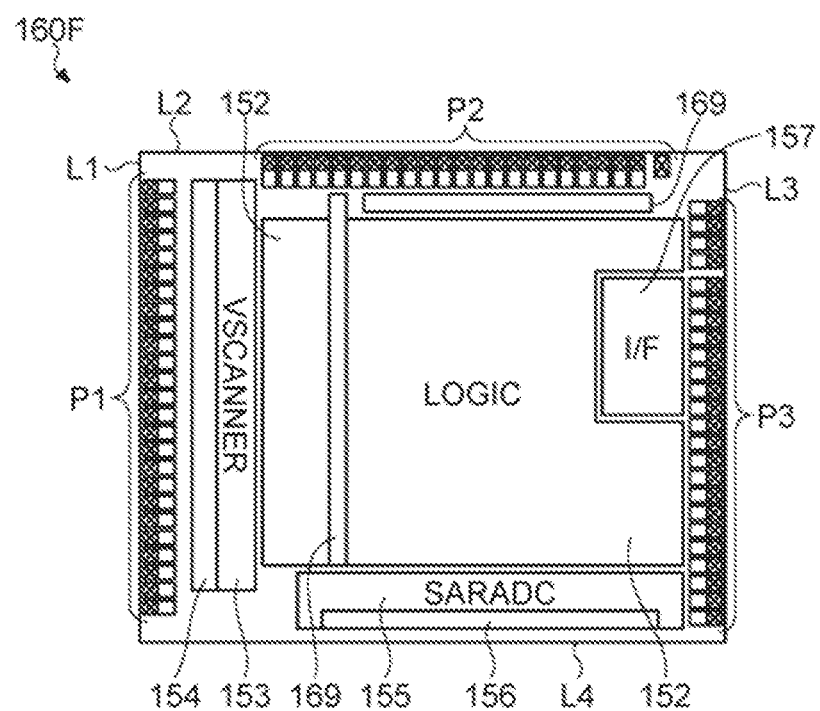
FIG. 19 is a plan view depicting a layout example of a second circuit chip according to the modification example of the first embodiment.

FIG. 17 to FIG. 19 are plan views depicting an example of a chip layout according to the modification example of the present embodiment. A layout example of a pixel chip 140F is depicted in FIG. 17, a layout example of a first circuit chip 15F is depicted in FIG. 18, and a layout example of a second circuit chip 160F is depicted in FIG. 19.

As depicted in FIG. 17 to FIG. 19, in the modification example, a configuration in which, for example, an EVS_AFE 151 and a peripheral circuit 158 among configurations arranged on a circuit chip 150 in a configuration similar to that of the first layout example depicted in FIG. 10 and FIG. 11 are arranged on a first circuit chip 150F and, for example, a logic circuit 152, a vertical driving circuit 153, an SARADC 155, an interface section 157, and connection sections (through contact via (TCV)) 154 and 156 thereamong are arranged on a second circuit chip 160F is included. In addition, connection sections 159 and 169 to input a signal processed by the EVS_AFE 151 to the logic circuit 152 on the second circuit chip 160F are respectively provided on the first circuit chip 150F and the second circuit chip 160F.

As described above, when the solid imaging device 100 is formed to have the stack structure of three or more layers, it becomes possible to disperse the sections arranged in each layer, whereby it becomes possible to further reduce a chip size. In addition, by the reduction of the chip size, a center O2 of an effective pixel region 141 can be brought closer to a chip center O1.

Since other configurations, operations, and effects may be similar to those in the above-described first embodiment, a detailed description thereof is omitted here.

2. Second Embodiment

Next, a solid imaging device and an electronic device according to the second embodiment will be described in detail with reference to the drawings. Note that in the following description, a configuration similar to that of the first embodiment or the modification example thereof is cited, and redundant description will be omitted.

In the first embodiment, a case where the solid imaging device 100 includes different types of sensors (such as the image sensor and the EVS) has been described as an example. On the other hand, a case where a solid imaging device is a single EVS will be described as an example in the second embodiment.

Note that a schematic configuration example and a system configuration example of the electronic device according to the present embodiment may be similar to the schematic configuration example and the system configuration example described with reference to FIG. 1 and FIG. 2 in the first embodiment, for example. However, in the present embodiment, the solid imaging device 100 is replaced with a solid imaging device 200. Furthermore, the solid imaging device 200 according to the present embodiment may have a configuration similar to, for example, a configuration in which a luminance pixel 10, a vertical driving circuit 102A, a horizontal driving circuit 102B, a luminance signal processing circuit 103A, a luminance data processing section 108A, a pixel driving line LD1, and a vertical signal line VSL1 are omitted from the configuration of the solid imaging device 100 described with reference to FIG. 3, and a stacked structure example thereof may be similar to the stacked structure described with reference to FIG. 4. However, in the present embodiment, the pixel chip 140 is replaced with a pixel chip 240, and the circuit chip 150 is replaced with a circuit chip 250. Furthermore, a unit pixel 110 according to the present embodiment may be similar to, for example, a configuration in which a luminance pixel 10 and a vertical signal line VSL1 are omitted from the circuit configuration example of the unit pixel 110 described with reference to FIG. 5.

2.1 Chip Layout Example

Next, a layout of each of the pixel chip 240 and the circuit chip 250 according to the present embodiment will be described with some examples.

2.1.1 First Layout Example

Figure 20:
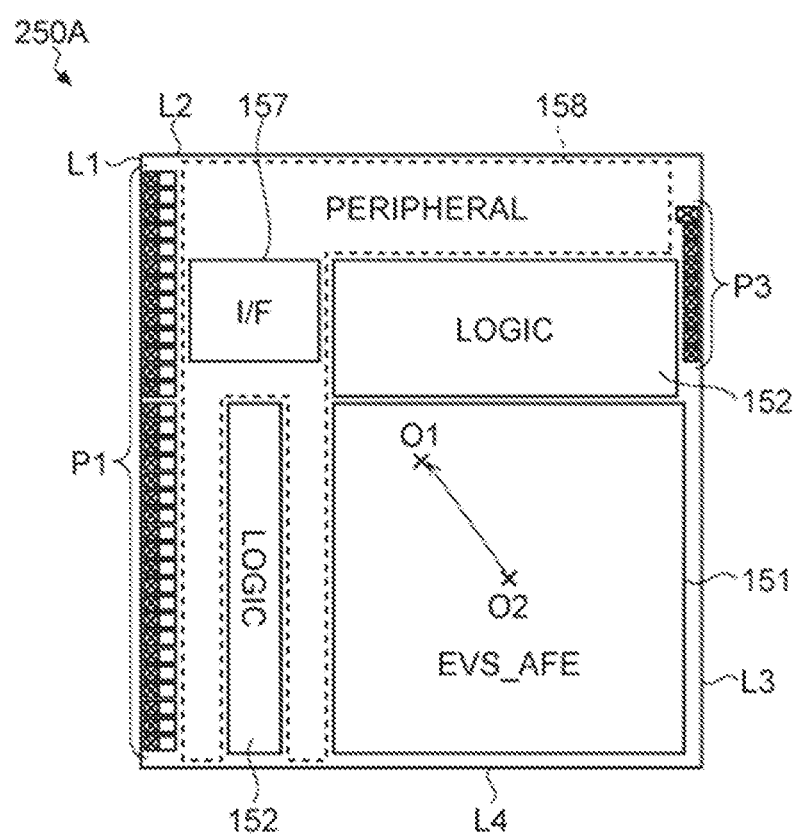
FIG. 20 is a plan view depicting a layout example of a circuit chip according to a first layout example of a second embodiment.

FIG. 20 is a plan view depicting an example of a chip layout according to the first layout example of the present embodiment, and is a diagram depicting a layout example of a circuit chip 250A. Note that since a layout example of a pixel chip 240 according to the first layout example can be easily conceived from the layout example of the circuit chip 250A (described later) and the first layout example according to the first embodiment described above, a description thereof will be omitted here.

As depicted in FIG. 20, the circuit chip 250A according to the first layout example has, for example, a configuration in which a vertical driving circuit 153, a connection section 154 thereof, an SARADC 155, a connection section 156 thereof, a test pad P2, and spare power supply pads P3*b* and P4 are omitted from a configuration similar to that of the circuit chip 150A according to the first layout example of the first embodiment. Furthermore, in the first layout example, an EVS_AFE 151 is arranged close to one corner (in the present example, a corner at which a chip end L3 and a chip end L4 intersect with each other) in the circuit chip 250A.

By employing such a layout, it becomes possible to shorten a wiring length of a vertical signal line VSL2, which transmits event data read from an event pixel 20, while shortening a wiring length of a pixel driving line LD2 to drive the event pixel 20, whereby it is possible to control a decrease in an SN ratio due to propagation loss or the like. In addition, by arranging a spare power supply pad P2*a* in the vicinity of a logic circuit 152, it becomes also possible to reinforce power supply to the logic circuit 152. Note that although omitted in the present example, a test pad P2 may be arranged at a chip end L2, for example.

2.1.2 Second Layout Example

Figure 21:
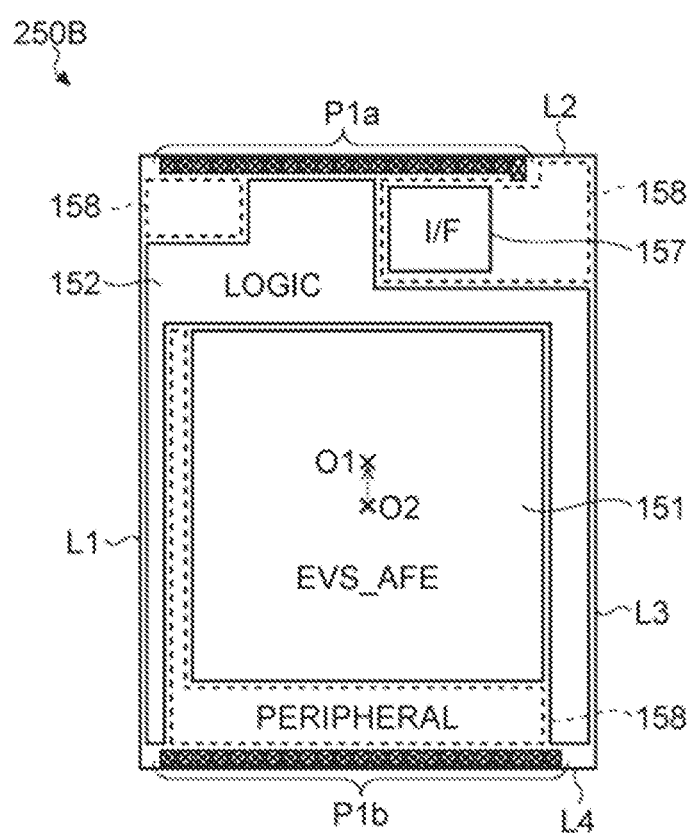
FIG. 21 is a plan view depicting a layout example of a circuit chip according to a second layout example of the second embodiment.

FIG. 21 is a plan view depicting an example of a chip layout according to the second layout example of the present embodiment, and is a diagram depicting a layout example of a circuit chip 250B. Note that since a layout example of a pixel chip 240 according to the second layout example can be easily conceived from the layout example of the circuit chip 250B (described later) and the first layout example according to the first embodiment described above, a description thereof will be omitted here.

As depicted in FIG. 21, the circuit chip 250B according to the second layout example has, for example, a configuration in which main pads P1*a* and P1*b* are separately arranged at two opposing chip ends (chip ends L2 and L4 in the present example) in a configuration similar to that of the circuit chip 250A according to the first layout example. Note that the main pads P1*a* and P1*b* may include a spare power supply pad, a test pad, and the like.

As described above, by separately arranging the main pads P1*a* and P1*b* at the two opposing chip ends L2 and L4 (chip ends L1 and L3 may be also used), a pixel array section 101 and an EVS_AFE 151 can be arranged close to a center of each chip. Thus, a layout in which a center O2 of an effective pixel region 141 is closer to a chip center O1 becomes possible, and a layout in which the center O2 of the effective pixel region 141 is shifted only in one direction (vertical direction in the present example) with respect to the chip center O1 becomes possible.

2.2 Conclusion

As described above, according to the present embodiment, the circuit configurations and the light receiving element can be suitably laid out.

For example, the main pad P1 used for connection with the outside is aggregated at the one chip end L1, whereby it becomes possible to simplify a connection configuration such as a flexible cable that connects the outside and the solid imaging device 200, and to improve efficiency of designing, assembling work, and the like of the connection configuration. At that time, by laying out functional blocks of the logic circuit 152 in such a manner that an output end of the logic circuit 152 is in the vicinity of the interface section 157, it is possible to achieve effects such as an increase in a speed of a signal output and a reduction in propagation loss.

In addition, by arranging the logic circuit 152 in such a manner as to surround the EVS_AFE 151 in a region adjacent to the EVS_AFE 151, it is possible to shorten the wiring length of the vertical signal line VSL2, which transmits the event data read from the event pixel 20, while shortening the wiring length of the pixel driving line LD2 to drive the event pixel 20. Thus, it becomes possible to control a decrease in the SN ratio due to propagation loss or the like. In addition, by arranging a spare power supply pad P2*a* in the vicinity of a logic circuit 152, it becomes also possible to reinforce power supply to the logic circuit 152.

Furthermore, in a case where a restriction that the main pads are aggregated at the one chip end L1 is released, it becomes possible to increase a degree of freedom with respect to the arrangement of each section. Thus, for example, it becomes possible to appropriately adjust the center O2 of the effective pixel region 141 and the chip center O1 while controlling an increase in the chip size, and to provide a layout in which the center O2 of the effective pixel region 141 is shifted only in one direction with respect to the chip center O1.

Since other configurations, operations, and effects may be similar to those in the above-described first embodiment, a detailed description thereof is omitted here.

3. Specific Example of an Electronic Device

Figure 22:
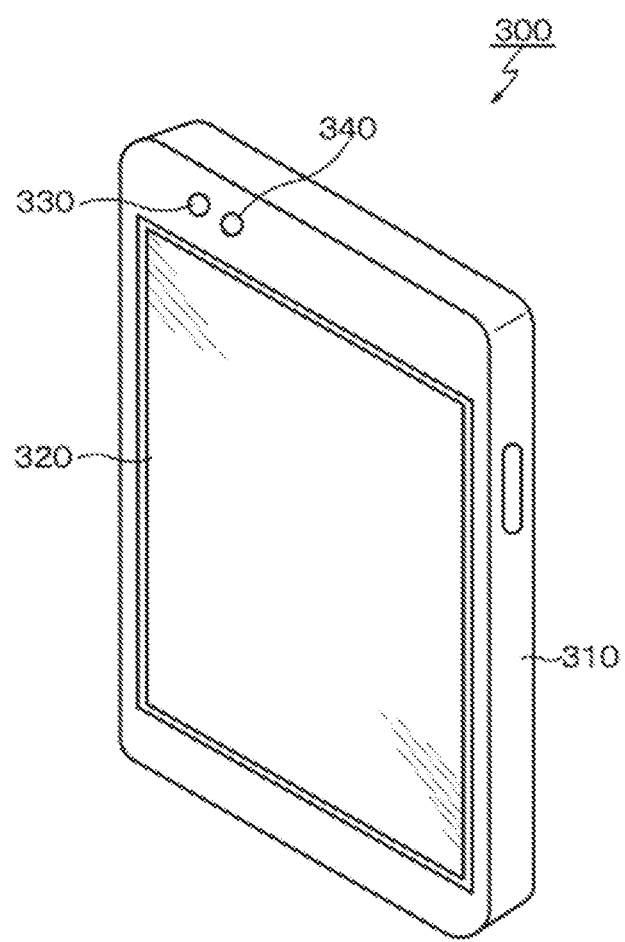
FIG. 22 is an external view on a front side of a smartphone according to a specific example of an electronic device of the present disclosure.

Here, a smartphone will be described as a specific example of an electronic device to which a recognition system of the present disclosure can be applied. An external view on a front side of a smartphone according to a specific example of the electronic device of the present disclosure is depicted in FIG. 22.

A smartphone 300 according to the present specific example includes a display section 320 on a front side of a housing 310. In addition, the smartphone 300 includes a light emitting section 330 and a light receiving section 340 in an upper section on the front side of the housing 310. Note that the arrangement example of the light emitting section 330 and the light receiving section 340 depicted in FIG. 22 is an example, and this arrangement example is not a limitation.

In the smartphone 300 that is an example of a mobile device having the above-described configuration, the laser light source 1010 (VCSEL 1012) in the electronic device 1 according to the above-described embodiment can be used as the light emitting section 330, and the solid imaging device 100 can be used as the light receiving section 340. That is, the smartphone 300 according to the present specific example is manufactured by utilization of the electronic device 1 according to the above-described embodiment as a three-dimensional image obtaining system.

The electronic device 1 according to the above-described embodiment can increase resolution of a distance image without increasing the number of light sources in an array dot arrangement of the light sources. Thus, the smartphone 300 according to the present specific example can have a highly accurate face recognition function (face authentication function) by using the electronic device 1 according to the above-described embodiment as the three-dimensional image obtaining system (face authentication system).

4. Example of Application to a Mobile Body

A technology according to the present disclosure can be applied to various products. For example, the technology according to the present disclosure may be realized as a device mounted on any type of mobile bodies such as an automobile, an electric vehicle, a hybrid electric vehicle, a motorcycle, a bicycle, a personal mobility device, an airplane, a drone, a ship, and a robot.

Figure 23:
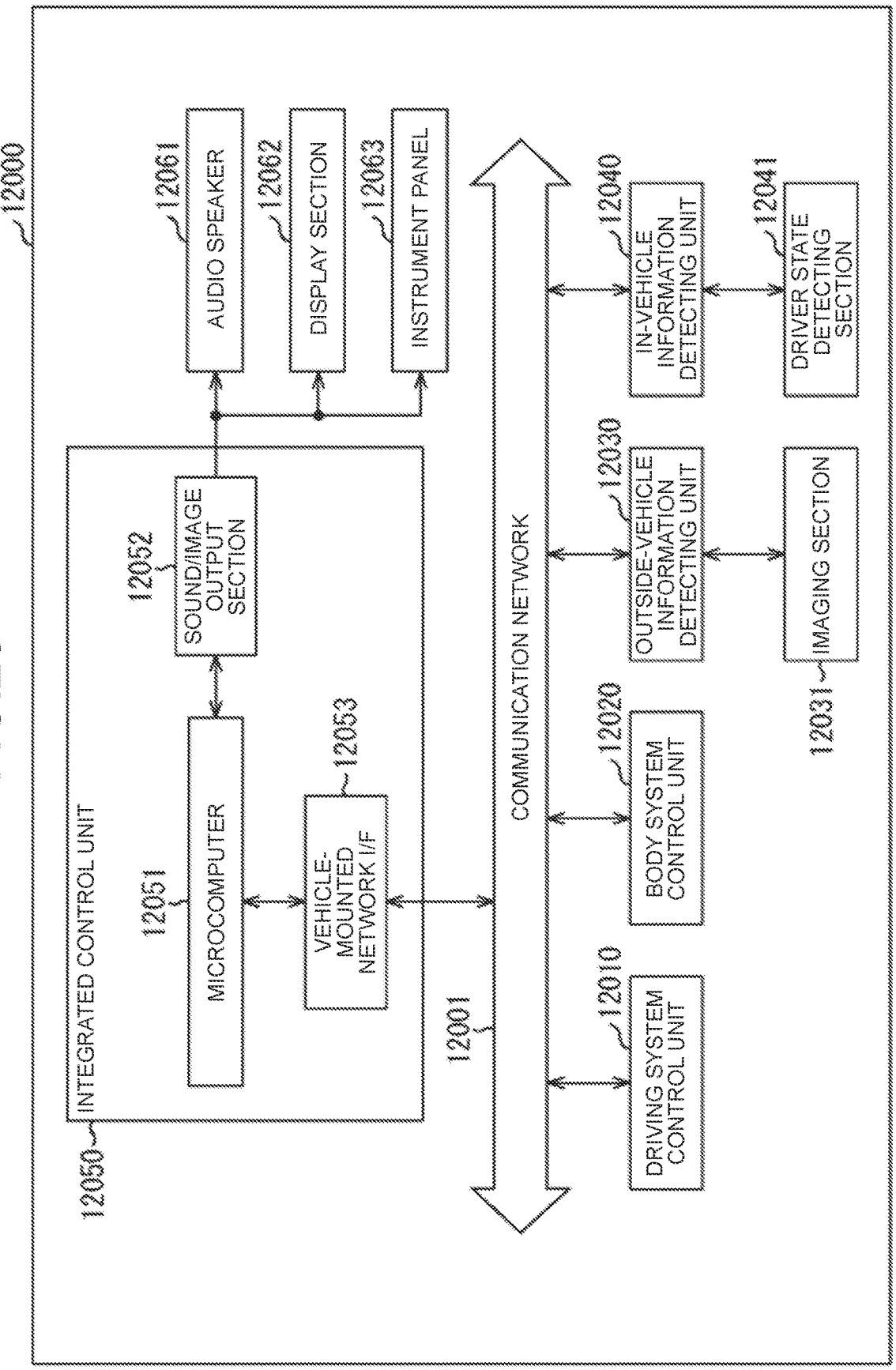
FIG. 23 is a block diagram depicting an example of schematic configuration of a vehicle control system.

FIG. 23 is a block diagram depicting an example of schematic configuration of a vehicle control system as an example of a mobile body control system to which the technology according to an embodiment of the present disclosure can be applied.

A vehicle control system 12000 includes a plurality of electronic control units connected to each other via a communication network 12001. In the example depicted in FIG. 23, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 23, an audio speaker 12061, a display section 12062, and an instrument panel 12063 are illustrated as the output device. The display section 12062 may, for example, include at least one of an on-board display and a head-up display.

Figure 24:
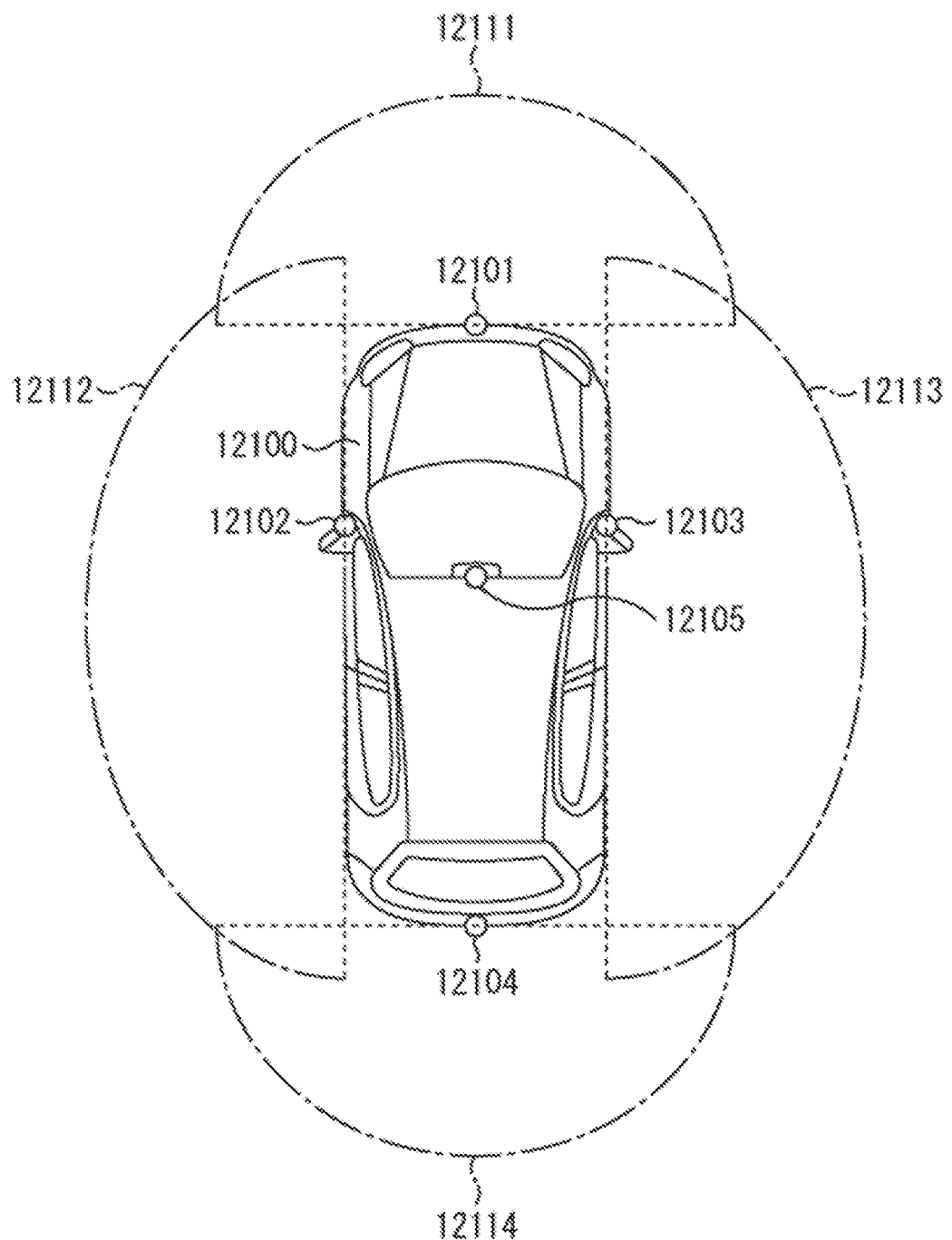
FIG. 24 is a diagram of assistance in explaining an example of installation positions of an outside-vehicle information detecting section and an imaging section.

FIG. 24 is a diagram depicting an example of the installation position of the imaging section 12031.

In FIG. 24, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of a vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 24 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 among the configurations described above. Specifically, mounting on the vehicle 12100 as the imaging sections 12101, 12102, 12103, 12104, 12105, and the like depicted in FIG. 24 is possible. By applying the technology according to the present disclosure to the imaging sections 12101, 12102, 12103, 12104, 12105, and the like, it becomes possible to improve accuracy of results obtained by integral processing of information (such as a color image and a monochrome image) obtained by different sensors.

Although embodiments of the present disclosure have been described above, the technical scope of the present disclosure is not limited to the above-described embodiments as they are, and various modifications can be made within the spirit and scope of the present disclosure. In addition, components of different embodiments and modification examples may be arbitrarily combined.

Also, an effect in each of the embodiments described in the present description is merely an example and is not a limitation, and there may be a different effect.

Note that the present technology can also have the following configurations.

(1)

A solid imaging device including:
  a plurality of unit pixels arrayed in a two-dimensional lattice pattern;
  an arbiter that arbitrates readout with respect to the plurality of unit pixels; and
  a first signal processing circuit that processes a first signal output from each of the unit pixels, wherein
  each of the unit pixels includes
  a plurality of photoelectric conversion sections arrayed in a two-dimensional lattice pattern, and a plurality of detection circuits that detects a luminance change in incident light to the photoelectric conversion sections on a basis of a photocurrent flowing out from each of the photoelectric conversion sections and outputs the first signal, the plurality of photoelectric conversion sections is arranged on a first chip, at least a part of each of the detection circuits, the arbiter, and the first signal processing circuit are arranged on a second chip stacked on the first chip, a first region in the first chip in which the plurality of photoelectric conversion sections is arrayed and a second region in the second chip in which at least a part of each of the detection circuits is arrayed are at least partially superimposed in a stacking direction of the first chip and the second chip, and a logic circuit including the arbiter and the first signal processing circuit is arranged in a third region at least partially adjacent to the second region in the second chip.

(2)

The solid imaging device according to (1), wherein one or more first pads that connect the logic circuit and an outside are arrayed in a vicinity of a first chip end of the second chip.

(3)

The solid imaging device according to (1), wherein two or more first pads that connect the logic circuit and an outside are arrayed separately at a first chip end of the second chip and a vicinity of a second chip end on an opposite side of a vicinity of the first chip end.

(4)

The solid imaging device according to (1), wherein each of the unit pixels includes a first pixel that includes the photoelectric conversion section and the detection circuit, detects the luminance change in the incident light, and outputs the first signal, and a second pixel that detects luminance of the incident light and outputs a second signal, a second signal processing circuit that processes the second signal output from the second pixel, and a driving circuit that drives the second pixel and reads the second signal are further included, the second signal processing circuit is included in the logic circuit, and the driving circuit is arranged on an opposite side of the second region across the third region in the second chip.

(5)

The solid imaging device according to (4), wherein the second pixel includes the photoelectric conversion section, and a pixel circuit that detects the luminance of the incident light to the photoelectric conversion section on a basis of a charge accumulated in the photoelectric conversion section, and outputs the second signal.

(6)

The solid imaging device according to (4) or (5), wherein one or more first pads that connect the logic circuit and the driving circuit to an outside are arrayed in a vicinity of a first chip end of the second chip.

(7)

The solid imaging device according to (6), wherein a second pad, which outputs a signal based on the second signal, in the first pads is arrayed in a vicinity of a third chip end different from the first chip end.

(8)

The solid imaging device according to (7), wherein a third pad, which outputs a signal based on the first signal, in the first pads is arrayed in a vicinity of the third chip end.

(9)

The solid imaging device according to (4) or (5), wherein one or more first pads that connect the logic circuit and the driving circuit to an outside are separately arrayed in a vicinity of a first chip end of the second chip and in a vicinity of a second chip end on an opposite side of the first chip end.

(10)

The solid imaging device according to any one of (4) to (9), further including a conversion circuit that converts the second signal output from the second pixel into a digital signal, wherein the conversion circuit is arranged in a fourth region located between a fifth chip end, which is on an opposite side of the second region across the third region in the second chip and is substantially perpendicular to a fourth chip end closest to the driving circuit, and the second region.

(11)

The solid imaging device according to any one of (6) to (9), further including:

a conversion circuit that converts the second signal output from the second pixel into a digital signal; and a fourth pad that is arranged on the second chip and that supplies auxiliary power to the conversion circuit, wherein the conversion circuit is arranged in a fourth region located between a fifth chip end, which is on an opposite side of the second region across the third region in the second chip and is substantially perpendicular to a fourth chip end closest to the driving circuit, and the second region, the first pads include a fifth pad that supplies power to the conversion circuit, and the fourth pad is arranged in a vicinity of a sixth chip end located in a vicinity of the conversion circuit in the second chip.

(12)

The solid imaging device according to any one of (6) to (9), further including a plurality of test pads for an operation test which test pads are arranged in a vicinity of a seventh chip end different from the first chip end.

(13)

The solid imaging device according to (2) or (6), wherein a center of the second chip is shifted from a center of the second region in a direction parallel or perpendicular to the first chip end.

(14)

A solid imaging device including:

a plurality of unit pixels each of which includes a first pixel that detects a luminance change in incident light and outputs a first signal, and a second pixel that detects luminance of the incident light and outputs a second signal, the plurality of unit pixels being arrayed in a two-dimensional lattice pattern;

an arbiter that arbitrates readout with respect to the first pixel;

a first signal processing circuit that processes the first signal output from each of the first pixels;

a driving circuit that drives the second pixel and reads the second signal; and a second signal processing circuit that processes the second signal output from the second pixel, wherein
each of the unit pixels includes
a plurality of photoelectric conversion sections arrayed in a two-dimensional lattice pattern, and
a plurality of detection circuits that detects a luminance change in incident light to the photoelectric conversion sections on a basis of a photocurrent flowing out from each of the photoelectric conversion sections, and outputs the first signal,
the plurality of photoelectric conversion sections is arranged on a first chip,
at least a part of each of the detection circuits is arranged on a second chip stacked on the first chip,
the arbiter, the first signal processing circuit, the driving circuit, and the second signal processing circuit are arranged on a third chip stacked on an opposite side of the first chip with respect to the second chip, and
a first region in the first chip in which the plurality of photoelectric conversion sections is arrayed and a second region in the second chip in which at least a part of each of the detection circuits is arrayed are at least partially superimposed in a stacking direction of the first chip and the second chip.

(15) An electronic device including:
the solid imaging device according to any one of (1) to (14);
a system control section that controls the solid imaging device; and
a processor that processes data output from the solid imaging device.

REFERENCE SIGNS LIST

1 ELECTRONIC DEVICE
10, 10-0 to 10-3 LUMINANCE PIXEL
11 TRANSFER TRANSISTOR
12 RESET TRANSISTOR
13 AMPLIFICATION TRANSISTOR
14 SELECTION TRANSISTOR
20, 20-0 to 20-3 EVENT PIXEL
21 DISCHARGE TRANSISTOR
100, 100A, 200 SOLID IMAGING DEVICE
101 PIXEL ARRAY SECTION
102A, 153 VERTICAL DRIVING CIRCUIT
102B HORIZONTAL DRIVING CIRCUIT
103A LUMINANCE SIGNAL PROCESSING CIRCUIT
103a AD CONVERSION CIRCUIT
103B EVENT SIGNAL PROCESSING CIRCUIT
103b SIGNAL PROCESSING CIRCUIT
104A X ARBITER
104B Y ARBITER
105 SYSTEM CONTROL CIRCUIT
108A LUMINANCE DATA PROCESSING SECTION
108B EVENT DATA PROCESSING SECTION
110, 110-1 UNIT PIXEL
111 PIXEL CIRCUIT
140, 140A, 140F PIXEL CHIP
141 EFFECTIVE PIXEL REGION
142 LIGHT-SHIELDED PIXEL REGION
143, 145 WIRING SECTION
144, 146, 154, 156, 169 CONNECTION SECTION
150, 150A to 150E, 250A, 250B CIRCUIT CHIP
150F FIRST CIRCUIT CHIP
151 EVS_AFE
152 LOGIC CIRCUIT
155 SARADC
157 INTERFACE SECTION
158 PERIPHERAL CIRCUIT
160F SECOND CIRCUIT CHIP
210 ADDRESS EVENT DETECTION CIRCUIT
211 LOGIC CIRCUIT
212, 212A LIGHT RECEIVING CIRCUIT
1010 LASER LIGHT SOURCE
1011 LIGHT SOURCE DRIVING SECTION
1012 VCSEL
1021 SENSOR CONTROL SECTION
1022 LIGHT RECEIVING SECTION
1030 IRRADIATION LENS
1040 IMAGING LENS
1050 SYSTEM CONTROL SECTION
1100 APPLICATION PROCESSOR
FD FLOATING DIFFUSION REGION
L1 to L4 CHIP END
LD1 and LD2 PIXEL DRIVING LINE
P1, P1a, P1b, and P1c MAIN PAD
P2 TEST PAD
P2a, P2b, P3a, P3b, P4 SPARE POWER SUPPLY PAD
P2c OUTPUT PAD
PD PHOTOELECTRIC CONVERSION SECTION
VSL1 and VSL2 VERTICAL SIGNAL LINE

The invention claimed is:
1. A solid imaging device including:
a plurality of unit pixels arrayed in a two-dimensional lattice pattern;
an arbiter that arbitrates readout with respect to the plurality of unit pixels; and
a first signal processing circuit that processes a first signal output from each of the unit pixels, wherein
each of the unit pixels includes
a plurality of photoelectric conversion sections arrayed in a two-dimensional lattice pattern, and
a plurality of detection circuits that detects a luminance change in incident light to the photoelectric conversion sections on a basis of a photocurrent flowing out from each of the photoelectric conversion sections and outputs the first signal,
the plurality of photoelectric conversion sections is arranged on a first chip,
at least a part of each of the detection circuits, the arbiter, and the first signal processing circuit are arranged on a second chip stacked on the first chip,
a first region in the first chip in which the plurality of photoelectric conversion sections is arrayed and a second region in the second chip in which at least a part of each of the detection circuits is arrayed are at least partially superimposed in a stacking direction of the first chip and the second chip, and
a logic circuit including the arbiter and the first signal processing circuit is arranged in a third region at least partially adjacent to the second region in the second chip.

2. The solid imaging device according to claim 1, wherein one or more first pads that connect the logic circuit and an outside are arrayed in a vicinity of a first chip end of the second chip.

3. The solid imaging device according to claim 1, wherein two or more first pads that connect the logic circuit and an outside are arrayed separately at a first chip end of the second chip and a vicinity of a second chip end on an opposite side of a vicinity of the first chip end.

4. The solid imaging device according to claim 1, wherein each of the unit pixels includes a first pixel that includes the photoelectric conversion section and the detection circuit, detects the luminance change in the incident light, and outputs the first signal, and a second pixel that detects luminance of the incident light and outputs a second signal, a second signal processing circuit that processes the second signal output from the second pixel, and a driving circuit that drives the second pixel and reads the second signal are further included, the second signal processing circuit is included in the logic circuit, and the driving circuit is arranged on an opposite side of the second region across the third region in the second chip.

5. The solid imaging device according to claim 4, wherein the second pixel includes the photoelectric conversion section, and a pixel circuit that detects the luminance of the incident light to the photoelectric conversion section on a basis of a charge accumulated in the photoelectric conversion section, and outputs the second signal.

6. The solid imaging device according to claim 4, wherein one or more first pads that connect the logic circuit and the driving circuit to an outside are arrayed in a vicinity of a first chip end of the second chip.

7. The solid imaging device according to claim 6, wherein a second pad, which outputs a signal based on the second signal, in the first pads is arrayed in a vicinity of a third chip end different from the first chip end.

8. The solid imaging device according to claim 7, wherein a third pad, which outputs a signal based on the first signal, in the first pads is arrayed in a vicinity of the third chip end.

9. The solid imaging device according to claim 4, wherein one or more first pads that connect the logic circuit and the driving circuit to an outside are separately arrayed in a vicinity of a first chip end of the second chip and in a vicinity of a second chip end on an opposite side of the first chip end.

10. The solid imaging device according to claim 4, further including a conversion circuit that converts the second signal output from the second pixel into a digital signal, wherein the conversion circuit is arranged in a fourth region located between a fifth chip end, which is on an opposite side of the second region across the third region in the second chip and is substantially perpendicular to a fourth chip end closest to the driving circuit, and the second region.

11. The solid imaging device according to claim 6, further including:

a conversion circuit that converts the second signal output from the second pixel into a digital signal; and a fourth pad that is arranged on the second chip and that supplies auxiliary power to the conversion circuit, wherein the conversion circuit is arranged in a fourth region located between a fifth chip end, which is on an opposite side of the second region across the third region in the second chip and is substantially perpendicular to a fourth chip end closest to the driving circuit, and the second region, the first pads include a fifth pad that supplies power to the conversion circuit, and the fourth pad is arranged in a vicinity of a sixth chip end located in a vicinity of the conversion circuit in the second chip.

12. The solid imaging device according to claim 6, further including a plurality of test pads for an operation test which test pads are arranged in a vicinity of a seventh chip end different from the first chip end.

13. The solid imaging device according to claim 2, wherein a center of the second chip is shifted from a center of the second region in a direction parallel or perpendicular to the first chip end.

14. A solid imaging device including:

a plurality of unit pixels each of which includes a first pixel that detects a luminance change in incident light and outputs a first signal, and a second pixel that detects luminance of the incident light and outputs a second signal, the plurality of unit pixels being arrayed in a two-dimensional lattice pattern;

an arbiter that arbitrates readout with respect to the first pixel;

a first signal processing circuit that processes the first signal output from each of the first pixels;

a driving circuit that drives the second pixel and reads the second signal; and a second signal processing circuit that processes the second signal output from the second pixel, wherein each of the unit pixels includes a plurality of photoelectric conversion sections arrayed in a two-dimensional lattice pattern, and a plurality of detection circuits that detects a luminance change in incident light to the photoelectric conversion sections on a basis of a photocurrent flowing out from each of the photoelectric conversion sections, and outputs the first signal, the plurality of photoelectric conversion sections is arranged on a first chip, at least a part of each of the detection circuits is arranged on a second chip stacked on the first chip, the arbiter, the first signal processing circuit, the driving circuit, and the second signal processing circuit are arranged on a third chip stacked on an opposite side of the first chip with respect to the second chip, and a first region in the first chip in which the plurality of photoelectric conversion sections is arrayed and a second region in the second chip in which at least a part of each of the detection circuits is arrayed are at least partially superimposed in a stacking direction of the first chip and the second chip.

15. An electronic device including:

the solid imaging device according to claim 1;

a system control section that controls the solid imaging device; and a processor that processes data output from the solid imaging device.

* * * * *